US011649336B2

(12) United States Patent
Collias et al.

(10) Patent No.: US 11,649,336 B2
(45) Date of Patent: *May 16, 2023

(54) RECYCLING OF SUPERABSORBENT POLYMER WITH AN EXTENSIONAL FLOW DEVICE

(71) Applicant: The Procter & Gamble Company, Cincinnati, OH (US)

(72) Inventors: Dimitris Ioannis Collias, Mason, OH (US); John Andrew McDaniel, West Chester, OH (US); Gary Wayne Gilbertson, Liberty Township, OH (US); Martin Ian James, Hamilton, OH (US); Arsen Arsenov Simonyan, Schwalbach (DE); Jose Carlos Garcia-Garcia, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 47 days.

This patent is subject to a terminal disclaimer.

(21) Appl. No.: 17/341,476

(22) Filed: Jun. 8, 2021

(65) Prior Publication Data
US 2021/0388172 A1 Dec. 16, 2021

Related U.S. Application Data

(60) Provisional application No. 63/039,496, filed on Jun. 16, 2020.

(51) Int. Cl.
*C08J 11/16* (2006.01)
*C08J 11/10* (2006.01)

(52) U.S. Cl.
CPC ............. *C08J 11/105* (2013.01); *C08J 11/16* (2013.01); *C08J 2333/08* (2013.01)

(58) Field of Classification Search
CPC ... C08J 11/24; C08J 2367/04; C08G 64/0208; C08G 64/403
USPC ........................................................ 521/48
See application file for complete search history.

(56) References Cited

U.S. PATENT DOCUMENTS

| 5,244,934 | A | 9/1993 | Umeda et al. |
|---|---|---|---|
| 6,143,820 | A | 11/2000 | Klier |
| 8,383,746 | B2 | 2/2013 | Torii |
| 8,517,595 | B2 | 8/2013 | Morrison, Jr. |
| 9,095,853 | B2 | 8/2015 | Somma |
| 9,156,034 | B2 | 10/2015 | Somma |
| 9,822,203 | B2 | 11/2017 | Haag |
| 9,850,192 | B2 | 12/2017 | Harris et al. |
| 11,154,839 | B2 | 10/2021 | Collias et al. |
| 11,396,587 | B2 | 7/2022 | Banaszak Holl et al. |
| 2009/0003123 | A1 | 1/2009 | Morrison, Jr. et al. |
| 2011/0210469 | A1 | 9/2011 | Keller |
| 2017/0095792 | A1 | 4/2017 | Kim et al. |
| 2017/0166707 | A1 | 6/2017 | Jang et al. |
| 2017/0198105 | A1 | 7/2017 | Lee et al. |
| 2021/0053028 | A1 | 2/2021 | Collias et al. |
| 2021/0054163 | A1 | 2/2021 | Collias et al. |
| 2021/0054164 | A1 | 2/2021 | Banaszak Holl et al. |

FOREIGN PATENT DOCUMENTS

JP H09249711 A 9/1997

OTHER PUBLICATIONS

Ebrahimi, R., et al., The Study of Ultrasonic Degradation of Superabsorbent Hydrogels; Organic Chemistry Inti,2012, Article ID 343768, 5 pages (Year: 2012).*
Shukla, N. B., and Madras, Photo, thermal, and ultrasonic degradation of EGDMA-crosslinked poly(acrylic acid-co-sodium acrylate-co-acrylamide) superabsorbentsG., J. Appl. Polym. Sci., 125 (2012), 630-639 (Year: 2011).*
Shukla, N. B., et al., PHoto, Thermal and Ultrasonic Degradation of EGDMA Crosslinked polyacrylic acid co sodium acrylate co acrylamide Superabsorbents; J. Appl. Polym. Sci., 112 (2009), 991-997 (Year: 2009).*
Prajapat, A. L., and Gogate, P. R., Intensification of depolymerization of polyacrylic acid solution using different approaches based on ultrasound and solar irradiation with intensification studies; Ultrasonic. Sonochem., 32(2016), 290-299 (Year: 2016).*
All Office Actions, U.S. Appl. No. 16/548,873.
All Office Actions, U.S. Appl. No. 16/999,127.
All Office Actions, U.S. Appl. No. 16/999,139.
Basedow et al., "Ultrasonic Degradation of Polymers in Solution", Advances in Polymer Science, vol. 22, 1977, pp. 83-148.
Caruso et al., "Mechanically-Induced Chemical Changes in Polymeric Materials", Chem. Rev. 2009, vol. 109, pp. 5755-5798.
Dubinsky et al., "Thermal Degradation of poly(acrylic acid) Containing Copper Nitrate", Polymer Degradation and Stability, vol. 86, 2004, pp. 171-178.
Ebrahimi et al., "The Study of Ultrasonic Degradation of Superabsorbent Hydrogels", vol. 2012, Article ID 343768, 05 pages.
Gurkaynak et al., "High-Temperature Degradation of Polyacrylic Acid in Aqueous Solution", Journal of Polymer Science Part A: Polymer Chemistry, vol. 34, 1996, pp. 349-355.
Kaczmarek et al., "Photo-Oxidative Degradation of Some Water-Soluble Polymers in the Presence of Accelerating Agents", Die Angewandte Makromolekulare Chemie 261/262, 1998, pp. 109-121.
Le'pine et al., "Thermal Degradation of Polyacrylic Acid in Dilute Aqueous Solution", Polymer Degradation and Stability, vol. 75, 2002, pp. 337-345.
Li et al., "Ultraviolet-Induced Decomposition of Acrylic Acid-Based Superabsorbent Hydrogels Crosslinked with N,N-Methylenebisacrylamide", Department of Chemistry and Chemical Engineering, Zhongkai University, Guangzhou, CN, Aug. 10, 2007, 7 pages.
Linden et al., "Photooxidative Degradation of Polymers by HO and HO2 Radicals Generated During the Photolysis of H2O2, FeCl3, and Fenton Reagents", Coordination Chemistry Reviews, 125 (1993) pp. 195-217.

(Continued)

*Primary Examiner* — Terressa Boykin
(74) *Attorney, Agent, or Firm* — James E. Oehlenschlager

(57) ABSTRACT

Poly(acrylic acid)-based superabsorbent polymer (SAP) in a feed stream is converted into poly(acrylic acid) (PAA) in an extensional flow device. The total energy used to degrade the SAP into PAA is less than about 50 MJ/kg SAP.

25 Claims, 4 Drawing Sheets

(56) References Cited

OTHER PUBLICATIONS

McGaugh et al., "The Thermal Degradation of Poly(Acrylic Acid)", Polymer Letters, vol. 5, 1967, pp. 817-820.

McNeill et al., "Thermal Stability and Degradation Mechanisms of Poly(Acrylic Acid and its Salts: Part 1—Poly(Acrylic Acid)", Polymer Degradation and Stability, 29 (1990), pp. 233-246.

McNeill et al., "Thermal Stability and Degradation Mechanisms of Poly(Acrylic Acid) and its Salts: Part 2—Sodium and Potassium Salts", Polymer Degradation and Stability, vol. 30, 1990, pp. 213-230.

McNeill et al., "Thermal Stability and Degradation Mechanisms of Poly(Acrylic Acid) and its Salts: Part 3—Magnesium and Calcium Salts", Polymer Degradation and Stability, vol. 30, 1990, pp. 267-282.

Mierzwa et al., "UV-Hydrogen Peroxide Processes", Advanced Oxidation Processes for Wastewater Treatment, Chapter 2, University of Sao Paulo, Sao Paulo SP Brazil, 2018, 36 pgs.

Prajapat et al., "Intensification of Depolymerization of Polyacrylic Acid Solution Using Different Approaches Based on Ultrasound and Solar Irradiation with Intensification Studies", Ultrasonics Sonochemistry, vol. 32, 2016, pp. 290-299.

Saita et al., "Degradation of Sodium-Polyacrylate in Dilute Aqueous Solution II", Japanese Journal of Applied Physics, vol. 22, No. 8, Aug. 1983, pp. 1310-1314.

Shukla et al, "Ultrasonic Degradation of Poly(acrylic acid)", Journal of Applied Polymer Science, vol. 112, 2009, pp. 991-997.

Shukla et al., "Oxidative and Photooxidative Degradation of Poly(acrylic acid)", Polymer Degradation and Stability, vol. 94, 2009, pp. 1238-1244.

Shukla et al., "Photo, Thermal and Ultrasonic Degradation of EGDMA-Crosslinked Poly(acrylic acid-co-sodium acrylate-co-acrylamide) Superabsorbents", Journal of Applied Polymer Science DOI 10.1002, Dept. of Chemical Engineering, Indian Institute of Science, 2011, pp. 630-639.

Unpublished U.S. Appl. No. 17/341,479, filed Jun. 8, 2021, to first inventor Dimitris Ioannis Collias.

All Office Actions; U.S. Appl. No. 17/341,479, filed Jun. 8, 2021.

PCT Search Report, and Written Opinion for PCT/US2021/037187 dated Oct. 22, 2021, 12 pages.

* cited by examiner

RECYCLING OF SUPERABSORBENT POLYMER WITH AN EXTENSIONAL FLOW DEVICE

FIELD OF THE INVENTION

The present invention generally relates to recycling of poly(acrylic acid)-based superabsorbent polymer (SAP) using an extensional flow device at short residence times, with optional and additional cavitation. More specifically, a feed stream comprising SAP is fed into the extensional flow device and a product stream is produced, which comprises essentially poly(acrylic acid) (PAA). The concentration of SAP in the feed stream is greater than about 1 wt %, and the total energy used to convert SAP to PAA is less than about 50 MJ/kg SAP.

BACKGROUND OF THE INVENTION

Recycling of absorbent hygiene products (AHPs) (i.e., baby diapers, feminine protection pads, and adult incontinence pads) is good for the environment and needed to achieve the sustainability goals of many consumer companies. These goals are about using 100% recycled materials and having zero consumer and manufacturing waste go to landfill. In addition to these goals, successful recycling benefits the environment, stimulates the economy, improves people's health and water quality, and generates energy needed by consumers in developing regions of the world.

The major component in AHPs is typically the superabsorbent polymer (SAP), whereas other components are adhesives, cellulose fibers, polyethylene, polypropylene, and polyester. SAP is a water-absorbing, water-swellable, and water-insoluble powdered solid which is a crosslinked and partially neutralized homopolymer of glacial acrylic acid. SAP has an exceptionally high ability to absorb aqueous liquids, such as contaminated water or urine. About 97% of SAP produced today is used in AHP applications, whereas the remainder about 3% is used in other applications, such as agricultural or horticultural water-retaining agents, and industrial waterproofing agents.

Recycling of AHPs involves cleaning of the AHPs from the soils accumulated during their use and separating the various components into recycled material streams. More specifically, the recycled SAP material stream can be used in applications less demanding than AHPs (since the recycled SAP has inferior properties compared to virgin SAP; for example, agricultural or horticultural water-retaining agents, and industrial waterproofing agents) and/or can be converted to essentially non-crosslinked, and slightly branched or linear poly(acrylic acid) (PAA). Then, this PAA can be used as a feed material to various applications. For example, the PAA can be: 1) used as-is in applications such as water treatment or corrosion inhibition; or 2) esterified and then used in adhesives, coatings, etc.; or 3) re-polymerized and re-crosslinked back to SAP; or 4) blended with virgin SAP. The first two sets of applications are part of the effort to recycle SAP into other products by replacing virgin acrylic-acid-based compounds with compounds derived from recycled SAP, whereas the last two sets of applications are part of the circular economy of SAP, i.e., recycling SAP back to SAP. In all cases, the objective is to achieve the same properties as virgin materials.

Non-limiting examples of processes that produce purified and separated material streams of used SAP from recycled AHPs are disclosed and claimed in U.S. Pat. No. 9,095,853 B2, issued on Aug. 4, 2015; and U.S. Pat. No. 9,156,034 B2, issued on Oct. 13, 2015; both assigned to Fater S.p.A, based in Pescara, Italy.

Most SAPs are based on poly(acrylic acid) and are crosslinked network materials. Non-limiting examples of procedures used to produce SAPs from glacial acrylic acid and crosslinkers are disclosed in U.S. Pat. No. 8,383,746 B2, issued on Feb. 26, 2013, and assigned to Nippon Shokubai Co., Ltd, based in Osaka, Japan; and U.S. Pat. No. 9,822,203 B2, issued on Nov. 21, 2017, and assigned to BASF SE, based in Ludwigshafen, Germany.

Ultrasonic degradation of SAP is described in: (1) Ebrahimi, R., et al., *Organic Chemistry Intl*, 2012, Article ID 343768, 5 pages; and (2) Shukla, N. B., and Madras, G., *J. Appl. Polym. Sci.*, 125 (2012), 630-639. Ultrasonic degradation of PAA is described in: (1) Shukla, N. B., et al., *J. Appl. Polym. Sci.*, 112 (2009), 991-997; and (2) Prajapat, A. L., and Gogate, P. R., *Ultrason. Sonochem.*, 32 (2016), 290-299. Also, a general description of ultrasonic degradation of polymers in solution is given in: Basedow, A. M., and Ebert, K. H., *Adv. Polym. Sci.*, 22 (1977), 83-148.

For the degradation of SAPs, both references used viscosity as a measure of the degradation level and found that it takes about 5 to 10 min to reduce the viscosity by one order of magnitude, e.g. from 10 Pa·s to 1 Pa·s, which indicates that a lot of energy is needed to achieve that level of degradation. For the degradation of linear polymers, the main themes from these references (as well as other references that report on the use of UV, thermal, and other forms of energy) are that the (1) preferential scission is at the mid-point of the polymer chain, (2) the higher molecular weight chains are degraded at a higher rate than the lower molecular weight chains, and (3) there is a minimum molecular weight below which degradation or de-polymerization does not occur. In all cases, the ultrasonic degradation of polymers is due to cavitation, and fast growth and collapse of the resulting microbubbles.

Accordingly, there is a need to recycle AHPs and their major component, which is SAP. For the recycling of SAP, there is a need to degrade SAP into poly(acrylic acid) (PAA), in short time scale; with low energy and power per unit mass of SAP; and at mild conditions, such as room temperature, thus avoiding decarboxylation of the degraded SAP. The requirement for low energy per unit mass of SAP stems from the fact that the recycling of used SAP and its degradation to PAA is beneficial only if the energy spent during the converting of SAP to PAA is less than that used to make fossil-derived acrylic acid (petro-AA) from propylene, which is about 50 MJ/kg AA. The PAA produced from SAP can then be incorporated back into virgin SAP (thus increasing its recycled content and supporting the circular economy of SAP) and/or derivatized into materials for other applications, such as, adhesives, coatings, water treatment, fabric care, etc.

SUMMARY OF THE INVENTION

In one embodiment of the present invention, a method for degrading a superabsorbent polymer (SAP) to poly(acrylic acid) (PAA) is presented. The method comprises flowing a feed stream comprising said SAP into an inlet of an extensional flow device and producing a product stream comprising said PAA at an outlet of said extensional flow device; wherein said feed stream comprises said SAP at a concentration greater than about 1 wt %; wherein said feed stream has a residence time in said extensional flow device of less than about 120 s; and wherein said degradation of said SAP to said PAA requires a total energy of less than about 50 MJ/kg SAP.

In another embodiment of the present invention, a method for degrading a superabsorbent polymer (SAP) to poly (acrylic acid) (PAA) is presented. The method comprises flowing a feed stream comprising said SAP into an inlet of an extensional flow device and producing a product stream comprising PAA at an outlet of said extensional flow device; wherein said feed stream comprises water and said SAP at a concentration greater than about 1 wt %; wherein said feed stream has a residence time in said extensional flow device of less than about 120 s; wherein said degradation of said SAP to said PAA requires a total energy of less than about 16 MJ/kg SAP; and wherein said PAA has a weight-average molecular weight less than about 1,000,000 g/mol.

In yet another embodiment of the present invention, a method for degrading a superabsorbent polymer (SAP) to poly(acrylic acid) (PAA) is presented. The method comprises flowing a feed stream comprising said SAP into an inlet of an extensional flow device and producing a product stream comprising PAA at an outlet of said extensional flow device; wherein said feed stream comprises water and said SAP at a concentration greater than about 5 wt %; wherein said feed stream has a residence time in said extensional flow device of less than about 120 s; wherein said degradation of said SAP to said PAA requires a total energy of less than about 16 MJ/kg SAP; and wherein said PAA has a weight-average molecular weight less than about 1,000,000 g/mol.

BRIEF DESCRIPTION OF THE DRAWINGS

While the specification concludes with claims particularly pointing out and distinctly claiming the invention, it is believed that the present invention will be better understood from the following description taken in conjunction with the accompanying drawings in which:

DETAILED DESCRIPTION OF THE INVENTION

I Definitions

Figure 1:
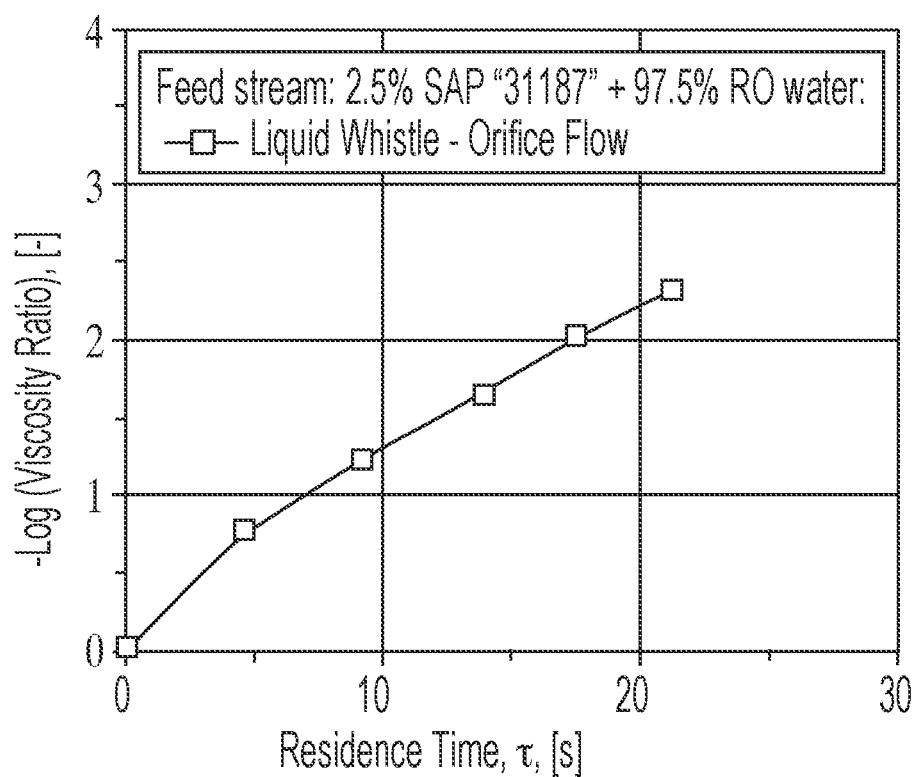
FIG. 1 is a graph showing the negative logarithm of the viscosity ratio between the feed and product streams as a function of the residence time of the feed stream in the Liquid Whistle, with only the orifice and without hydrodynamic cavitation (i.e., the blade was not engaged), and for the 2.5 wt % SAP and 97.5 wt % reverse osmosis (RO) water feed stream.

As used herein, the term "SAP" refers to crosslinked, partially neutralized, and poly(acrylic acid)-based superabsorbent polymer. SAP examples are disclosed in U.S. Pat. Nos. 8,383,746 B2 and 9,822,203 B2. Typically, SAP is capable of absorbing a 0.9 wt % saline solution at 25° C. at least 10 times its dry weight. The typical absorption mechanism is osmotic pressure. SAP that absorbs water or aqueous solutions becomes a gel.

As used herein, the term "degree of neutralization" or "DN" refers to the mol percentage of the acid groups in SAP or PAA that are neutralized by the reaction with a base (typically, sodium hydroxide). A typical method to measure the DN of an SAP is to measure the Na content using the Inductively Coupled Plasma (ICP) analytical technique, as it is well known to those skilled in the art. If the amount of Na is wt % (Na), then the degree of neutralization is calculated as DN=100×72/((23×100 wt % (Na))−22).

As used herein, the term "poly(acrylic acid)" or "PAA" or "polymer of acrylic acid" refers to an essentially non-crosslinked, and either slightly branched or linear poly (acrylic acid) molecule with acrylic acid as the monomeric unit and degree of polymerization that can be 2 or higher. For the purposes of the present invention, there will be no difference between a polymer of acrylic acid and an oligomer of acrylic acid.

As used herein, the term "degradation" refers to the conversion of SAP into PAA via the actions of partial de-polymerization, de-crosslinking, molecular backbone breaking, or any combination of the above actions. For the purposes of the present invention, the terms degradation, recycling, and conversion are used interchangeably, as long as they refer to the transformation of SAP to PAA. Also, the degradation essentially preserves the carboxylic groups of the SAP and thus the product PAA contains those carboxylic groups. Note that full de-polymerization of SAP should lead to acrylic acid (AA).

As used herein, the term "virgin SAP" refers to SAP produced from virgin glacial acrylic acid, which is the feedstock used today to make SAP. Virgin acrylic acid can be produced from either fossil-derived propylene or other bio-derived materials (non-limiting examples of bio-materials are: lactic acid, 3-hydroxypropionic acid, glycerin, bio-propylene, carbon dioxide, and sugar). Virgin SAP does not include any recycled SAP above about 1 wt %.

As used herein, the term "used SAP" refers to SAP which has already been produced industrially and/or used commercially, for example, in a baby diaper, feminine pad, adult incontinence pad, or other articles and/or uses. Used SAP can be post-consumer SAP, post-industrial SAP, or combinations of both. Unless otherwise noted in this invention, SAP refers to either "used SAP" or "virgin SAP".

As used herein, the term "degraded SAP" refers to SAP which has been degraded to PAA. For the purposes of the present invention, the terms "degraded SAP" and "PAA" are used interchangeably.

As used herein, the term "recycled SAP" refers to SAP which contains at least 1 wt % degraded SAP (or equivalently, PAA) that has been incorporated into the SAP while the SAP is being produced from glacial acrylic acid using the typical production method. Thus, the recycled SAP is a blend of virgin SAP and at least 1 wt % degraded SAP.

As used herein, the term "feed stream" refers to a body of fluid that flows in a specific direction and feeds into an inlet of an extensional flow device.

As used herein, the term "product stream" refers to a body of fluid that is produced at an outlet of an extensional flow device when the feed stream is fed into an inlet of the same device.

As used herein, the term "Liquid Whistle" refers to a Sonolator type of equipment (manufactured by the Sonic Corporation, Stratford, Conn.) which employs, in the flow direction, an inlet chamber, an orifice, and a mixing chamber with a blade in front of the orifice. Material flows through the orifice and the generated jet impinges on the blade which is then forced to vibrate at its resonant frequency and further enhance the cavitation field, if it is located within 7 to 8 times the hydraulic diameter of the orifice away from the orifice (i.e., the blade is engaged). If the blade is located outside the range of 7 to 8 times the hydraulic diameter of the orifice away from the orifice, then it is considered that the blade is not engaged. The closer to the orifice the blade is and the lower the viscosity of the feed stream is the stronger the cavitation is. The main uses of the Liquid Whistle (LW) are mixing, emulsification, deagglomeration, and disinfection in the home, personal care, and fine chemicals industries (U.S. Pat. No. 8,517,595 B2 and Ryan, D. J., et al., *Chem. Engng Sci.*, 189 (2018), 369-379). For the purposes of the present invention, LW is one of the extensional flow devices that can be used.

As used herein, the term "extensional flow device" refers to a flow device that generates extensional flow, strain, and stress. Non-limiting examples of extensional flow devices are devices with converging and/or diverging channels, orifices, impinging jets, four roll mills, screens, dies, etc. The terms "extensional" and "elongational" are used interchangeably for the purposes of the present invention.

As used herein, the terms "viscosity ratio" or "viscosity reduction ratio" refer to the ratio of the viscosity of the product stream to that of the feed stream. The viscosity of the feed stream is typically measured with a parallel plate fixture in oscillatory mode, and the complex viscosity reported typically corresponds to a frequency of 1 rad/s. The viscosity of the product stream is measured with either a cup and bob fixture in steady mode or parallel plate fixture in oscillatory mode. When the viscosity is measured with a cup and bob fixture in steady mode the viscosity reported typically corresponds to a shear rate of $4\ s^{-1}$. These viscosity measurement techniques are well known to those skilled in the art. For the purposes of the present invention, the negative of the logarithm of the viscosity ratio indicates the extent of the SAP degradation to PAA in orders of magnitude, as it is accepted by those skilled in the art that the lower the viscosity of a PAA solution the lower the molecular weight of the PAA is, at a fixed concentration.

As used herein, $M_n$ is the number average molecular weight, in g/mol or equivalently Da, $M_w$ is the weight average molecular weight, in g/mol or equivalently Da, $M_z$ is the z-average molecular weight, in g/mol or equivalently Da, and PDI is the polydispersity index defined as $M_w/M_n$.

"Disposable" is used in its ordinary sense to mean an article that is disposed or discarded after a limited number of usage over varying lengths of time, for example, less than 20 usages, less than 10 usages, less than 5 usages, or less than 2 usages. If the disposable absorbent article is a diaper, a pant, sanitary napkin, sanitary pad or wet wipe for personal hygiene use, the disposable absorbent article may (and most often is) intended to be disposed after single use.

II Feed Stream

Unexpectedly, it has been found that SAP degrades to PAA (i.e., essentially, without decarboxylation) when the SAP feed stream (which is in the form of a gel) flows in the extensional flow device (e.g. LW) and experiences the extensional flow at short residence times. Without wishing to be bound by any theory, applicants believe that the extensional stresses generated in the SAP feed stream/gel, as it flows through the orifice, cause stretching and breaking of the cross-linker, cross-linker attachments to the backbone, and backbone bonds. Applicants expected that gels would generate slip at the walls of the inlet chamber and orifice, and thus they would not generate extensional stresses as they would flow in plug flow in the inlet chamber and orifice (as it is well known to those skilled in the art). Also, unexpectedly, it has been found that the PAA produced from the degradation of SAP with the extensional flow device has narrow Molecular Weight Distribution (MWD), i.e., low PDI. This is expected with linear polymers, but unexpected with crosslinked polymers.

The typical properties of SAP are mechanical properties, swelling capacity, saline flow conductivity (SFC), absorption against pressure (AAP; INDA test method WSP 242.2), residual monomer, extractable polymer (amount of extractables), and centrifuge retention capacity (CRC). Also, for the purposes of the present invention, the SAP can include other co-monomers, such as itaconic acid, acrylamide, 2-Acryloylamino-2-methylpropane-1-sulfonic acid, etc., or other materials, such as starch, cellulosic fibers, clays, etc.

SAP is typically prepared using a homogeneous solution polymerization process or by multi-phase polymerization techniques, such as inverse emulsion or suspension polymerization. The polymerization reaction generally occurs in the presence of a relatively small amount of di- or polyfunctional monomers, such as N,N'-methylene bisacrylamide, trimethylolpropane triacrylate, (poly) ethylene glycol di(meth)acrylate, triallylamine, etc. The di- or poly-functional monomer compounds serve to lightly crosslink the acrylate polymer chains, thereby rendering the SAP water-insoluble, yet water-swellable. Furthermore, SAP can be surface-crosslinked after polymerization by reaction with suitable crosslinking agents, such as di/poly-epoxides, di/poly-alcohols, di/poly-haloalkanes, etc. SAP is typically in particulate form, which, in the case of solution polymerization, is produced from a slab of material with any typical size reduction techniques, such as milling.

SAP can be fully un-neutralized (DN=0), fully neutralized (DN=100%), or partly neutralized. In one embodiment of the present invention, the SAP has DN greater than about 50%. In another embodiment of the present invention, the SAP has DN between about 65% and about 75%. In yet another embodiment of the present invention, the SAP has DN greater than about 75%. In even yet another embodiment of the present invention, the SAP has DN lower than about 50%.

In one embodiment of the present invention, the feed stream comprises SAP. In another embodiment of the present invention, the feed stream comprises SAP and water. In yet another embodiment of the present invention, the feed stream comprises SAP and ethylene glycol (EG). In even yet another embodiment of the present invention, the feed stream comprises SAP, water, and ethylene glycol. The water in the feed stream can be RO water, regular tap water, or water containing dissolved inorganic salts at various salt concentrations. A non-limiting example of water with salt is a 0.9 wt % solution of sodium chloride. Other salts with monovalent cations, but higher ionic strength, can be used to reduce the viscosity of the feed stream or alternatively to enable higher SAP concentration to be used. A non-limiting example of a viscosity reducing salt is sodium sulfate.

The feed stream can also comprise any free radical producing chemical compound. Non-limiting examples of such chemical compounds are hydrogen peroxide ($H_2O_2$), persulfate (such as, sodium persulfate or potassium persulfate), perborate, perphosphate, percarbonate, diazo compounds, ozone, organic free radical initiators (e.g. di-ter-butyl peroxide (DTBP)), combinations thereof, etc.

In one embodiment of the present invention, the feed stream comprises SAP and $H_2O_2$. In another embodiment of the present invention, the feed stream comprises SAP and a $H_2O_2$ solution.

In one embodiment of the present invention, the feed stream comprises SAP at a concentration greater than about 1 wt %. In another embodiment of the present invention, the feed stream comprises SAP at a concentration greater than about 5 wt %. In yet another embodiment of the present invention, the feed stream comprises SAP at a concentration greater than about 10 wt %. In even yet another embodiment of the present invention, the feed stream comprises SAP at a concentration of about 2.5 wt %. In one embodiment of the present invention, the feed stream comprises SAP at a concentration of about 5 wt %.

In one embodiment of the present invention, the feed comprises SAP and a $H_2O_2$ solution, and the concentration of the SAP is about 2.5 wt %, the concentration of the $H_2O_2$ solution is 97.5 wt %, and the concentration of the $H_2O_2$ in the $H_2O_2$ solution is less than about 3 wt %. In another embodiment of the present invention, the feed comprises SAP and a $H_2O_2$, and the concentration of the SAP is about 5 wt %, the concentration of the $H_2O_2$ solution is about 95 wt %, and the concentration of the $H_2O_2$ in the $H_2O_2$ solution is less than about 3 wt %. In yet another embodiment of the present invention, the feed comprises SAP and a $H_2O_2$ solution, and the concentration of the SAP is about 2.5 wt %, the concentration of the $H_2O_2$ solution is 97.5 wt %, and the concentration of the $H_2O_2$ in the $H_2O_2$ solution is about 3 wt %. In another embodiment of the present invention, the feed comprises SAP and a $H_2O_2$, and the concentration of the SAP is about 5 wt %, the concentration of the $H_2O_2$ solution is about 95 wt %, and the concentration of the $H_2O_2$ in the $H_2O_2$ solution is about 3 wt %.

In one embodiment of the present invention, the feed comprises SAP and a $H_2O_2$ solution, and the concentration of the SAP is about 2.5 wt %, the concentration of the $H_2O_2$ solution is 97.5 wt %, and the concentration of the $H_2O_2$ in the $H_2O_2$ solution is about 0.3 wt %. In another embodiment of the present invention, the feed comprises SAP and a $H_2O_2$, and the concentration of the SAP is about 5 wt %, the concentration of the $H_2O_2$ solution is about 95 wt %, and the concentration of the $H_2O_2$ in the $H_2O_2$ solution is about 0.3 wt %. In yet another embodiment of the present invention, the feed comprises SAP and a $H_2O_2$ solution, and the concentration of the SAP is about 2.5 wt %, the concentration of the $H_2O_2$ solution is 97.5 wt %, and the concentration of the $H_2O_2$ in the $H_2O_2$ solution is about 0.03 wt %. In another embodiment of the present invention, the feed comprises SAP and a $H_2O_2$, and the concentration of the SAP is about 5 wt %, the concentration of the $H_2O_2$ solution is about 95 wt %, and the concentration of the $H_2O_2$ in the $H_2O_2$ solution is about 0.03 wt %.

In one embodiment of the present invention, the feed comprises SAP and a $H_2O_2$ solution, and the concentration of the $H_2O_2$ in the $H_2O_2$ solution is less than about 3 wt %. In another embodiment of the present invention, the feed comprises SAP and $H_2O_2$, and the concentration of the $H_2O_2$ in the $H_2O_2$ solution is less than about 0.3 wt %. In yet another embodiment of the present invention, the feed comprises SAP and $H_2O_2$ solution, and the concentration of the $H_2O_2$ in the $H_2O_2$ solution is less than about 0.03 wt %.

The viscosity of the feed stream is typically measured with a parallel plate fixture in oscillatory mode, and the complex viscosity reported typically corresponds to a frequency of 1 rad/s. Depending on the SAP concentration the complex viscosity of the feed stream can be higher than 200 Pa·s (or equivalently, 200,000 cP). The feed stream can be in the form of a solution or gel, depending on the concentration of SAP.

The non-renewable energy use (NREU) to make acrylic acid (AA) from the fossil-derived propylene is estimated to be about 50 MJ/kg SAP (equivalently, 50 MJ/kg AA). Therefore, any successful recycling attempt of SAP needs to expend less energy than the NREU to make AA, i.e., less than about 50 MJ/kg SAP. For the purposes of the NREU, it is assumed that the SAP is fully non-neutralized (DN=0).

III Extensional Flow Device and Cavitation

Typically, the feed stream is in fluid communication with the extensional flow device via a tube or a channel, and a pump. Non-limiting examples of tubes or channels are glass tubes, metal tubes, alloy tubes (such as, stainless-steel tubes), and polymer tubes. The tube or channel can have any cross-sectional shape, such as, circular, rectangular, oval, rhombic, etc. Also, the size of the cross-sectional area of the tube or channel can be the same or vary along the flow direction. A non-limiting example of a varying cross-sectional shape of a tube is an undulating tube that can cause the feed stream to experience extensional stresses as it flows down the tube. These extensional stresses might be beneficial to the degradation of the SAP that is part of the feed stream. Also, the feed stream can go through static mixers or other mixing elements placed inside the tube and/or channel that the feed stream flows through.

Non-limiting examples of pumps are centrifugal pumps (such as, axial, radial, and mixed flow pumps) and positive displacement pumps (such as, reciprocating, rotary, piston, diaphragm, gear, peristaltic, screw, and vane). The extensional flow device can employ one or more pumps.

In one embodiment of the present invention, the extensional flow device is a Liquid Whistle (LW). Typically, a LW includes, in the flow direction, an inlet chamber, an orifice, and a mixing chamber, where a blade is located in front of the orifice and at a distance from it. Also, typically, an extensional flow device includes an inlet and an outlet. The feed stream enters the extensional flow device at the inlet and the product stream exits the extensional flow device at the outlet. Non-limiting examples of extensional flow devices are the SONOLATOR® from Sonic Corp. and MICROFLUIDIZER® from Microfluidics Corp (Newton, Mass.). In one embodiment of the present invention, there is no blade downstream of the orifice in the LW.

Non-limiting configurations of the orifice are slot-shaped, eye-shaped, elliptically-shaped, circular, triangular, square, rectangular, and polygonal. The width of the orifice can be up to 1 in. (2.541 cm) or more. The height of the orifice can be up to 0.5 in. (1.27 cm) or more. In another embodiment of the present invention, the orifice is elliptically-shaped. In yet another embodiment of the present invention, the width of the orifice is about 1.9 mm and the height of the orifice is about 0.6 mm. Non-limiting examples of the materials used to make the orifice housing are stainless steel, titanium, ceramics, cemented tungsten carbide, various borides, various carbons, various carbides, and various diborides. The land length of the orifice can be up to 10 mm. In one embodiment of the present invention, the land length of the orifice is between about 0.5 mm and about 5 mm. In another embodiment of the present invention, the land length of the orifice is about 1 mm.

When the blade of a LW vibrates with its natural frequency it generates intense cavitation and the formed bubbles grow and collapse extremely fast. Non-limiting examples of the materials used to make the blade are stainless steel, titanium, ceramics, cemented tungsten carbide, various borides, various carbons, various carbides, and various diborides. The blade of a LW can have suitable configurations, such as, but not limited to, tapered, with sharpened edge or edges, rectangular or square cross section, etc. The blade of a LW can have any suitable dimensions. In one embodiment of the present invention, the length of the blade of a LW is between about 1 mm and about 100 mm. In another embodiment of the present invention, the length of the blade of a LW is between about 10 mm and about 50 mm. In yet another embodiment of the present invention, the thickness of the blade of a LW is between about 7 µm and about 100 mm. In another embodiment of the present invention, the thickness of the blade of a LW is between about 0.2 mm and about 50 mm.

The cavitation introduced by the vibrating blade of a LW can be hydrodynamic, acoustic (e.g. between 20 Hz and 20 kHz), or ultrasonic (e.g. above 20 kHz). In one embodiment of the present invention, the blade of a LW undergoes ultrasonic vibration at a frequency between about 20 kHz and about 100 kHz.

The distance between the blade and the orifice of a LW can vary from about 0.1 mm to about 25 mm. In one embodiment of the present invention, the distance between the blade and the orifice of a LW is about 0.5 mm. In another embodiment of the present invention, the distance between the blade and the orifice of a LW is between about 0.5 mm and about 13 mm. In yet another embodiment of the present invention, the distance between the blade and the orifice of a LW is between about 1 mm and about 10 mm. In even yet another embodiment of the present invention, the distance between the blade and the orifice of a LW is between about 3 mm and about 6 mm.

In one embodiment of the present invention, the blade is at a distance from the orifice of a LW so that no cavitation is achieved when the fluid jet emerges from the orifice and impinges onto the blade. In another embodiment of the present invention, the blade is at a distance from the orifice of a LW so that cavitation is achieved when the fluid jet emerges from the orifice and impinges onto the blade. In yet another embodiment of the present invention, the cavitation achieved in the extensional flow device is hydrodynamic. In even yet another embodiment of the present invention, the cavitation achieved in the extensional flow device is ultrasonic. In one embodiment of the present invention, the cavitation achieved in the extensional flow device is acoustic.

In one embodiment of the present invention, the distance of the blade from the orifice of a LW is at least about 7 times the hydraulic diameter of the orifice. In another embodiment of the present invention, the distance of the blade from the orifice of a LW is less than about 7 times the hydraulic diameter of the orifice. In yet another embodiment of the present invention, the distance of the blade from the orifice of a LW is about 6 times the hydraulic diameter of the orifice. In even yet another embodiment of the present invention, the distance of the blade from the orifice of a LW is at about 0.3 times the hydraulic diameter of the orifice.

The process may be carried out at any suitable pressure, which is measured at the feed stream and upstream of the orifice. In one embodiment of the present invention, the pressure is between about 500 psi (34.5 bar) and about 20,000 psi (1379 bar). In another embodiment of the present invention, the pressure is higher than about 20,000 psi (1379 bar). In yet another embodiment of the present invention, the pressure is between about 1000 psi (68.9 bar) and about 10,000 psi (689.5 bar). In even yet another embodiment of the present invention, the pressure is between about 2,000 psi (137.9 bar) and about 7,000 psi (482.6 bar). In one embodiment of the present invention, the pressure is about 5,000 psi (344.7 bar).

The flowrate of the feed stream into the extensional flow device can be of any suitable value. In one embodiment of the present invention, the flowrate of the feed stream into the extensional flow device is between about 1 L/min and about 1,000 L/min. In another embodiment of the present invention, the flowrate of the feed stream into the extensional flow device is between about 2 L/min and about 500 L/min. In yet another embodiment of the present invention, the flowrate of the feed stream into the extensional flow device is between about 3 L/min and about 200 L/min. In even yet another embodiment of the present invention, the flowrate of the feed stream into the extensional flow device is between about 4 L/min and about 100 L/min. In one embodiment of the present invention, the flowrate of the feed stream into the extensional flow device is about 5 L/min.

The residence time of the feed stream in the extensional flow device can be of any suitable value. The residence time is defined as the average time the feed stream spends in the extensional flow device as a whole, not only in the orifice nor in the inlet and mixing chambers only. In one embodiment of the present invention, the residence time of the feed stream in the extensional flow device is less than about 120 s. In another embodiment of the present invention, the residence time of the feed stream in the extensional flow device is less than about 60 s. In yet another embodiment of the present invention, the residence time of the feed stream in the extensional flow device is less than about 15 s. In one embodiment of the present invention, the residence time of the feed stream in the extensional flow device is between about 1.5 s and about 50 s. In another embodiment of the present invention, the residence time of the feed stream in the extensional flow device is between about 2 s and about 20 s. In yet another embodiment of the present invention, the residence time of the feed stream in the extensional flow device is between about 2.5 s and about 10 s. In even yet another embodiment of the present invention, the residence time of the feed stream in the extensional flow device is between about 3 s and 5 s.

The residence time of the feed stream in the orifice of the extensional flow device can be of any suitable value. In one embodiment of the present invention, the residence time of the feed stream in the orifice is between about 1 ms and about 100 ms. In another embodiment of the present invention, the residence time of the feed stream in the orifice is between about 2 ms and about 50 ms. In yet another embodiment of the present invention, the residence time of the feed stream in the orifice is between about 5 ms and about 20 ms. In even yet another embodiment of the present invention, the residence time of the feed stream in the orifice is between about 7 ms and about 15 ms. In one embodiment of the present invention, the residence time of the feed stream in the orifice is about 11 ms.

The total energy is the electric energy that is supplied to the extensional flow device and is based on the voltage and amperage of the device, and the residence time of the feed stream. The specific energy is the energy that is dissipated in the feed stream inside the extensional flow device, it is used to convert SAP to PAA, and is based on the pressure drop in the feed stream as it flows through the extensional flow system. The calculations for the total energy and specific energy are exemplified in the Methods section VII (as they are well known to those skilled in the art).

In one embodiment of the present invention, the specific energy used to convert SAP to PAA is less than about 30 MJ/kg SAP. In another embodiment of the present invention, the specific energy used to convert SAP to PAA is less than about 20 MJ/kg SAP. In yet another embodiment of the present invention, the specific energy used to convert SAP to PAA is less than about 10 MJ/kg SAP. In even yet another embodiment of the present invention, the specific energy used to convert SAP to PAA is less than about 5 MJ/kg SAP. In one embodiment of the present invention, the specific energy used to convert SAP to PAA is less than about 1 MJ/kg SAP.

In one embodiment of the present invention, the total energy used to convert SAP to PAA is less than about 50 MJ/kg SAP. In another embodiment of the present invention, the total energy used to convert SAP to PAA is less than about 32 MJ/kg SAP. In yet another embodiment of the present invention, the total energy used to convert SAP to PAA is less than about 16 MJ/kg SAP. In even yet another embodiment of the present invention, the total energy used to convert SAP to PAA is less than about 10 MJ/kg SAP. In one embodiment of the present invention, the total energy used to convert SAP to PAA is less than about 2 MJ/kg SAP.

The extensional flow can take place at room temperature or any other temperature. Furthermore, the extensional flow can be preceded or followed by other degradation processes, such as microwave heating, UV irradiation, IR heating, ultrasonic/cavitation, extrusion, extensional stretching, etc.

The extensional flow can also take place simultaneously with oxidative, enzymatic, or biological degradation.

Oxidative Degradation Method

Unexpectedly, it has been found that SAP can be degraded into soluble PAA, especially in the form of polymers of acrylic acid by mixing the SAP with an oxidative water-soluble salt (herein after referred to as "salt"). The salt comprises at least one cation and at least one anion. The SAP and salt are mixed with an aqueous carrier, such as water or physiological saline.

By heating the mixture to a temperature of from 30° C. to 200° C. (hereinafter referred to as "elevated temperature") at least some of the anions are decomposed into radicals. The elevated temperature may be at least 35° C., or at least 40° C., or at least 50° C., or at least 60° C., or at least 70° C., or at least 80° C. The elevated temperature may be less than 190° C., or less than 180° C., or less than 150° C. Generally, at elevated temperatures exceeding 200° C., the SAP starts to break down and decay in an uncontrolled manner, which is not desirable for the present invention. Upon heating, a hydrogen atom of the salt, more specifically: a hydrogen atom of the anion(s) of the salt, is abstracted and the anion forms a radical. The elevated temperature to which the mixture is heated may be at least 10° C. below the decomposition temperature of the salt (leading to radical formation), or the mixture may be heated to an elevated temperature that is at least the decomposition temperature, or may be heated to an elevated temperature of at least 10° C. above the decomposition temperature of the salt.

The "decomposition temperature", as used herein, is the 10-hour half-life temperature in water, which, for example, is 69° C. for ammonium persulfate and 60° C. for potassium persulfate. Thus, the choice of the most optimal temperature range inter alia depends on the choice of the salt, as different salts (specifically different anions) have different decomposition temperatures. The radicals, which have been formed, can react with the SAP, e.g. by reacting with an aliphatic C—H group comprised in the polymer chains of the SAP. As a result of this radical reaction, the polymer chain of the SAP is broken-up and a carbon-centered radical is formed at the broken up SAP polymer chain. The reaction may also take place at a carboxyl group of the SAP, also leading to a carbon-centered radical. Still alternatively or in addition, the reaction may take place at a nitrogen atom, which may be comprised by a cross-linker that has been used to initially make the SAP. If the reaction takes place at a nitrogen atom, a nitrogen-centered radical is formed instead of a carbon-centered radical.

Without wishing to be bound by theory, it is believed that the following reaction scheme exemplarily shows the degradation process of the SAP into soluble PAA (i.e. the "decrosslinked polymer products" below):

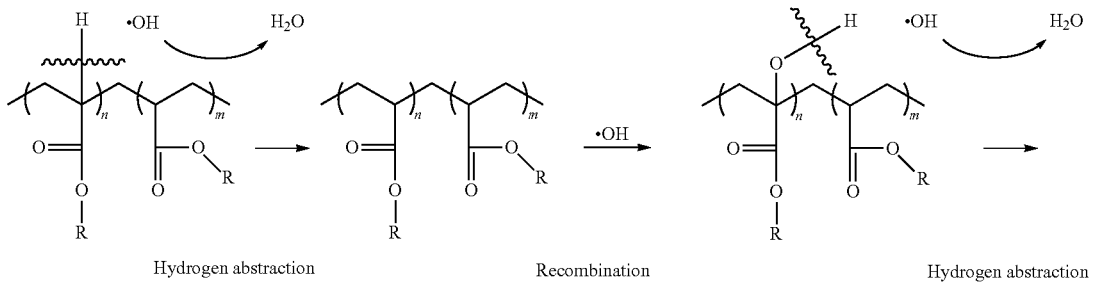

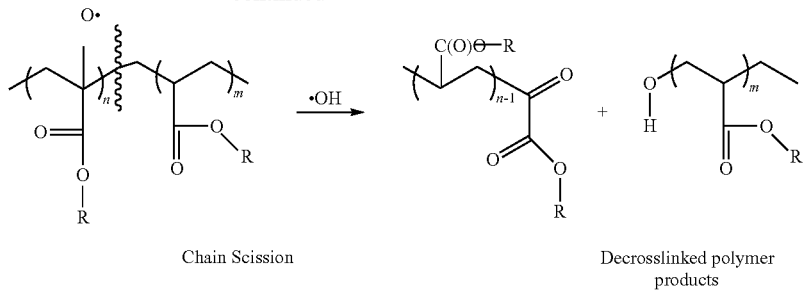

Chain Scission    Decrosslinked polymer products wherein R is H, or alkaline cation, ammonium cation, or crosslinking residue The mixture may be maintained at the elevated temperature for from 10 minutes to 5 hours, preferably from 10 min to 4 h, more preferably from 10 min to 3 h. Shorter times are preferred from an economical perspective. Shorter process times may be obtained e.g. by higher salt concentration, higher temperatures (however, below 200° C.) and/or by optimized mixing of SAP and salt. The time during which the mixture is kept at the elevated temperature also depends on the degree of degradation that is desirable (i.e. average molecular weight of PAA obtained by the process). Generally, once the SAP has been degraded such that no, or only minor amounts of, insoluble SAP are present, indicating that the majority of SAP has been decomposed into soluble PAA, the mixture may no longer need to be maintained at the elevated temperature and the temperature may be decreased to room temperature (25° C.) or below.

The SAP, salt and aqueous carrier may be mixed, e.g. by pre-mixing the salt and the aqueous carrier, such that the salt is, partly or completely, dissolved in the aqueous carrier. The aqueous carrier with the salt dissolved therein can then be mixed with the SAP, such as by spraying the aqueous carrier with dissolved salt onto the SAP. After having sprayed the aqueous carrier with dissolved salt onto the SAP, the mixture may or may not be further mixed, depending e.g. on the amount of SAP, i.e. the thickness of the layer of SAP. If the aqueous carrier with dissolved salt is sprayed onto a thin layer of SAP such that the SAP is appropriately contacted with the aqueous carrier and dissolved salt, further mixing may not be necessary.

Alternatively to pre-mixing the aqueous carrier with the salt to dissolve the salt in the aqueous carrier, it is also possible to provide the aqueous carrier and the salt separately to the SAP, such that the salt is only dissolved in the aqueous carrier after having been mixed with the SAP. Importantly, the salt has to be able to dissolve in the aqueous carrier, either after being contacted with the SAP or, preferably, prior to being contacted with the SAP.

The aqueous carrier may be pre-heated to the elevated temperature prior to mixing the aqueous carrier with the salt and SAP. Such preheating may accelerate the degradation method. Alternatively, the aqueous carrier may be pre-heated, however to a temperature below the elevated temperature prior to mixing with the salt and SAP. Still further alternatively, the aqueous carrier may not be pre-heated prior to mixing with the salt and SAP and the heating to the elevated temperature is done after aqueous carrier, salt and SAP are mixed.

If the salt is dissolved in the aqueous carrier prior to mixing with the SAP, the aqueous carrier may be pre-heated to a temperature below the elevated temperature to avoid that the anions prematurely form radicals, such that the anions degrade by self-decomposition and are subsequently no longer available for degradation of the SAP after mixing with the SAP. However, if the salt is dissolved in the aqueous carrier only a short time or immediately before mixing with the SAP, the aqueous carrier may be pre-heated to the elevated temperature before mixing with the SAP. Pre-heating may speed up the time for the salt to dissolve in the aqueous carrier.

Alternatively, or in addition, the SAP may be pre-heated to the elevated temperature or to a temperature below the elevated temperature before mixing with the aqueous carrier and salt. Pre-heated SAP may lead to shorter swelling time of the SAP, thus accelerating the absorption of the aqueous carrier and dissolved salt into the SAP particles, enabling faster degradation. Faster absorption of the dissolved salt into the SAP may also improve homogenous dispersion of the dissolved salt within the SAP, which may help more homogeneous degradation, thus avoiding that non-degraded pieces of the SAP are left in the mixture.

Still alternatively, the mixture obtained in method step d) may be heated to the elevated temperature only after at least 50 wt %, or at least 70 wt %, or at least 90 wt % or all of the aqueous carrier with salt dissolved therein has been absorbed into the SAP. Some pre-heating to a temperature below the elevated temperature may nevertheless already be done before.

The ratio of salt to SAP may be from 0.001 g of salt to 0.05 g of salt per 1 g of SAP, or may be from 0.005 g of salt to 0.03 g of salt per 1 g of SAP, or may be from 0.01 g of salt to 0.03 g of salt per 1 g of SAP.

The ratio of aqueous carrier to SAP may be from 2 g to 20 g of aqueous carrier per 1 g of SAP, or may be from 5 g to 15 g of aqueous carrier per 1 g of SAP. The SAP may be provided in method step a) dry or swollen to less than 20 g, or less than 15 g, or less than 10 g, or less than 5 g of liquid (such as water or physiological saline) per g of SAP.

The total amount of liquid absorbed into (i.e. comprised in) the SAP in method step e)—including the liquid comprised in the swollen SAP as provided in method step a) (if the SAP is not provided as dry SAP) and the amount aqueous carrier absorbed into and thus comprised by the SAP in method step e), may be from 2 g to 25 g per 1 g of SAP, or may be from 2 g to 20 g per 1 g of SAP, or may be from 5 g to 15 g per 1 g of SAP, or may be from 8 g to 13 g per 1 g of SAP. As used herein, "dry SAP" means that the SAP has a liquid content of less than 0.20 g per g of SAP, preferably less than 0.15 g per g SAP (referred to as "moisture content"). The moisture content of the SAP is measured according to the EDANA Moisture Content Test Method NWSP 230.0.R2 (15) or via a Moisture Analyzer (HX204 from Mettler Toledo, drying temperature 130° C., starting superabsorber weight 3.0 g (±0.5 g), stop criterion 1 mg/140 s). If the moisture content of the superabsorbent polymer particles is greater than 3 weight %, then the SAP are dried to a moisture level of <3 wt %, e.g. in an oven at 105° C. for 3 h or e.g. at 120° C. for 2 h.

To ensure that the salt can be used to efficiently degrade the SAP, it is desirable that a significant amount of the aqueous carrier, with the salt being dissolved therein, is absorbed into the SAP in method step d) and e). At least 50 wt %, or at least 60 wt %, or at least 75 wt %, or at least 90 wt %, or 100 wt % of the aqueous carrier provided in step c), with the salt dissolved therein, may be absorbed into the SAP. Absorption of the aqueous carrier, with salt dissolved therein, in method step d) and e) means, that the aqueous carrier, with salt dissolved therein, may be absorbed in method step d) only (this will be the case especially when 100 wt % are absorbed), or predominantly in method step e) (this may be the case if the heating is already starting while the SAP, salt and aqueous carrier are mixed), or a portion of the aqueous carrier with salt dissolved therein is absorbed into the SAP in method step d) while another portion of the aqueous carrier with salt dissolved therein is absorbed into the SAP in method step e).

The SAP provided in method step a) may have a Centrifuge Retention Capacity (CRC) value of from 10 g/g to 50 g/g, or from 10 g/g to 40 g/g. if recycled AGM, needs to be dried and then measure CRC as measured according to the CRC test method (EDANA method NWSP 241.0.R2).

If the SAP provided in method step a) is post-consumer recycled SAP, (a sample of) the SAP has to be dried first and then CRC is measured for this sample to determine the CRC of the SAP.

The at least one anion of the salt may be selected from the group consisting of: peroxydisulfate, peroxymonosulfate, peroxydicarbonate, peroxydiphosphate, peroxydiborate, or mixtures thereof.

The at least one cation of the salt is not critical in that the cation does not dissociate into radicals. Thus, the choice of the cation does not directly impact the degradation process because the cation does not form radicals. The at least one cation may be chosen to have sufficient solubility in the aqueous carrier, and it should be available at relatively low cost. The at least one cation may be selected from the group consisting of: $Li^+$, $Na^+$, $K^+$, $Rb^+$, $Cs^+$, $NH_4^+$, organically substituted ammonium, Ca2+, Mg2+, Sr2+, Ba2+, Al3+, transition metal cations of 1+ to 3+ oxidation state, or mixtures thereof (e.g. combinations of different salts having different cations). Most preferred are one or more alkaline cations and $NH_4^+$ cations.

At least 50% by total weight of the salt, or at least 60% by weight, or at least 70% by weight, or at least 80% by weight, or at least 90% by weight, or 100% may be an alkaline persulfate.

Hydrogen peroxide may be added in the method. Hydrogen peroxide can help to increase the yield per time of PAA, i.e. the rate of degradation. Hydrogen peroxide can also help to decolorize the decomposed contaminants. The hydrogen peroxide may be added to the SAP as a separate aqueous solution, or it may be added in the aqueous carrier, with or without the salt being dissolved in the aqueous carrier, prior to mixing with the SAP. The amount of hydrogen peroxide used in the method of the present invention may be from 10 wt % to 200 wt % based on weight of the salt, or may be from 20 wt % to 100 wt % by weight of the salt, or may be from 30 weight % to 80 wt % by weight of the salt.

Method step e) may be carried out at a pH of 3-7. Typically, no further, special measures are required to obtain a pH in this range. Persulfate radicals, for example, as less stable at pH above 7.

Additives may be used in the method of the present invention. For example, small molecular weight alcohols, such as methanol, ethanol, propanol, isopropanol, butanol, ethylene glycol, propylene glycol, glycerin or mixtures thereof may be added to the aqueous carrier provided in method step c) or added to the mixture of method step d). These additives may support the initial wettability of the SAP with aqueous carrier and salt dissolved therein. They may also improve the stability of the aqueous carrier against bacterial contamination. Other additives such as anti-bacterial additives may also be added. The total amount of additives may not be more than 10 wt %, or not more than 8 wt %, or not more than 5 wt %, or not more than 3 wt % based on the weight of the aqueous carrier.

The method of the present invention can be carried out in a continuous process or as a batch process. Generally, continuous processes are often preferred from a commercial/cost perspective. In a continuous process, the SAP may, for example, be provided in a continuous stream, e.g. on a carrier belt or the like, and aqueous carrier and salt are mixed with the SAP, e.g. by spraying the aqueous carrier and salt (and, optionally, the hydrogen peroxide) onto the SAP. The mixture of SAP, salt and aqueous carrier can be transferred onto a belt after method step d) (e.g. after the aqueous carrier with salt dissolved therein has been partly or fully absorbed into the SAP) and heated in a continuous or batch fashion.

Alternatively, the aqueous carrier can be provided in a batch vessel or similar container (with salt dissolved therein prior to or after providing the aqueous carrier into the vessel. SAP can then be added in the vessel, which already is filled with the aqueous carrier and dissolved salt. and the SAP may be left to absorb the aqueous carrier and salt dissolved therein and, simultaneously or subsequently, the mixture can be heated to the elevated temperature.

For SAP, especially if provided as dry SAP particles, air tends to tends to be "trapped" between the particles, i.e. in the interstices between the SAP particles as they absorb liquid and swell. Hence, the swollen SAP tend to "float" in liquid. As the SAP are degraded, the solubilized PAA may sink down in the vessel, where it can (continuously) be removed. To avoid that non-degraded or partly degraded SAP are removed together with the PAA (as some SAP may sink in the vessel), a mesh or the like may be installed within the vessel to hinder the non- or fully degraded SAP particles from sinking further to the bottom of the vessel, as they will be captured in the mesh until they are more fully degraded and able to pass through the mesh.

Alternatively, the mixture of SAP, salt and aqueous carrier may also be stirred such that the swollen SAP particles sink towards the ground of a vessel and the soluble PAA, i.e. the product of the method, can be removed from the upper part of the vessel.

The obtained solution with the PAA solubilized therein, may be transferred, e.g. via pumps, to a different vessel, to a pipe, or any other appropriate device, for any posttreatment that may be desired for the solution. Possible post-treatments are filtration, desalination, concentration via evaporation, or numerous other treatments.

The energy consumption of the degradation process inter alia depends on the elevated temperatures. The higher the elevated temperature, the higher the energy consumption per time (i.e. a short process time at higher elevated temperature may overall require less energy than a relatively lower elevated temperature with relatively longer process time). For example, the energy consumption is about 3.5 MJ/kg dry AGM for an elevated temperature of about 100° C. for a batch process in an insulated vessel, i.e. a process where the heating to the elevated temperature is done only once.

The SAP provided in method step a) may be in particulate form. The SAP provided in the method can be virgin SAP, post-consumer recycled SAP (PCR SAP), post-industrial recycled SAP (PIR SAP), or a combination of those materials. "Post-consumer SAP" and "post-consumer recycled SAP" (PCR SAP) are used herein interchangeably and, as used herein, refer to SAP which has been comprised by an AHP and the AHP has been used by a consumer (e.g. worn by an incontinent user). After use, the AHP is recycled and the PCR SAP is isolated from the AHP. However, for the method of the present invention, it is not necessary that the SAP is purified such that no other components of the post-consumer AHP are comprised by the post-consumer SAP which is provided for the method of the invention.

"Post-industrial SAP" and "post-industrial recycled SAP" (PIR SAP) are used herein interchangeably and, as used herein, refer to SAP which may or may not have been comprised by an AHP. The PIR SAP has not been previously used, e.g. it was not comprised by an AHP which has been used by a consumer. Instead, the PIR SAP may be derived from AHPs which have been sorted out during production, e.g. because they are defective. The PIR SAP may also have been sorted out during SAP production, e.g. because they do not meet the required performance targets (such as capacity, whiteness or the like). Thus, for the latter scenario, the PIR SAP was not previously comprised by an AHP.

The typical properties of SAP are mechanical properties, swelling capacity, saline flow conductivity (SFC), absorption against pressure (AAP), residual monomer, extractables, and cylinder retention capacity (CRC). Also, for the purposes of the present invention, the SAP can include other co-monomers, such as itaconic acid, acrylamide, etc. The amount of co-monomers may be less than 20 wt %, or less than 10 wt %, or less than 1 wt %, or less than 0.5 wt % per total weight of the dry SAP.

SAP is typically prepared using a homogeneous solution polymerization process or by multi-phase polymerization techniques, such as inverse emulsion or suspension polymerization. The polymerization reaction is generally done in the presence of a relatively small amount of di- or poly-functional monomers, such as N,N'-methylene bisacrylamide, triacrylate, ethylene glycol de(meth)acrylate, triallylamine, etc. The di- or poly-functional monomer compounds serve to lightly crosslink the acrylate polymer chains, thereby rendering the SAP water-insoluble, yet water-swellable. Furthermore, SAP can be surface-crosslinked after polymerization by reaction with a suitable crosslinking agents, such as di/poly-epoxides, di/poly-alcohols, di/poly-haloalkanes, etc. SAP provided for the method of the present invention may be in particulate form. The particulate form may be produced from a slab of material with any typical size reduction techniques, such as milling.

SAP can be fully un-neutralized (in which case, DN=0), fully neutralized (in which case, DN=100%), or partly neutralized. In one embodiment of the present invention, the SAP has DN greater than about 50%. In another embodiment of the present invention, the SAP has DN between about 65% and about 75%. In yet another embodiment of the present invention, the SAP has DN greater than about 75%. In even yet another embodiment of the present invention, the SAP has DN lower than about 50%.

The SAP provided to the method of the present invention may be in dry form or may be partly swollen with water, saline or urine (e.g. urine in PCR SAP). Hence, the SAP may be swollen to from 0.05 g/g to 20 g/g with water, saline or urine, preferably to from 0.05 g/g to 15 g/g, more preferably to from 0.10 g/g to 10 g/g, more preferably to from 0.20 g/g to 5 g/g, and even more preferably to from 0.50 g/g to 2 g/g. Completely dry (i.e. 0 g/g of water, saline or urine) may be less advantageous for the method of the present invention, because it takes longer for completely dry SAP to absorb the aqueous carrier with the salt dissolved therein. On the other hand, SAP which is excessively swollen (or even fully swollen) when provided to the method, may also lead to an increase in time until the salt dissolved in the aqueous carrier is absorbed into the SAP. The SAPs provided to the method may have an absorbent capacity CRC (measured as Centrifuge Retention Capacity "CRC" according to EDANA method NWSP 241.0.R2) of from 10 g/g to 50 g/g.

The amount of aqueous carrier provided in method step c) may be such that the SAP provided in step a) are able to swell to at least 20%, or at least 30%, 50%, or at least 60% or at least 70%, or at least 80% of their CRC upon absorption of all aqueous carrier provided. If the SAP not provided dry but pre-swollen (see further details below), the less aqueous carrier is required to obtain the desired degree of SAP load, i.e. the desired CRC.

Upon absorption of liquid, the polymer chains within the polymer network of the SAP start to disentangle. Such disentanglement will make the polymer network easier accessible for the radicals formed from the anions of the salt. Hence, degradation is improved. If the amount of aqueous carrier provided in step c) does not enable the SAP to swell to at least 20% of their CRC upon absorption of the aqueous carrier, the polymer chains within the polymer network of the SAP may not be able to sufficiently disentangle, making degradation slower or overall less effective.

For the degradation method of the present invention, the use of post-consumer SAP may be beneficial over the use of virgin SAP: The polymer chains in the polymer network of a previously swollen and then at least partly red-dried SAP have already been disentangled. Re-swelling and thus anewed disentanglement is believed to be faster versus swelling of virgin SAP. Previously swollen and then re-dried SAP has been found to have higher CRC when being swollen after re-drying compared to the CRC measured when swelling the SAP for the first time from virgin SAP. If post-consumer SAP is provided in partly swollen form for the method of the present invention, it is also advantageous that there is no need to completely dry the SAP for use in the method, given that drying of post-consumer SAP is time- and energy consuming. However, post-consumer SAP may be sterilized prior to providing it to the method of the invention.

If post-consumer SAP or post-industrial SAP are isolated from AHPs to be provided for the method of the present invention, the SAP does not necessarily need to be purified such that no other components of the AHPs are present. Instead, it has been found that the SAP may be contaminated with other components of the AHP, such as synthetic fibrous materials or films (e.g. fibers, sheets, films, and fibrous layers), cellulose fibers, adhesives, inks, dyes, surfactants etc. The amount of these contaminants may not be more than 20% by weight of the mixture of SAP and contaminants, or may not be more than 15% by weight, or not more than 10% by weight, or not more than 5% by weight, or not more than 2% by weight, or not more than 1% by weight.

If the post-consumer SAP is still swollen, e.g. with urine or other liquid, this urine or other liquid comprised by the SAP is not taken into consideration when calculating the amount of contaminants by weight of the mixture of SAP and contaminants.

If the SAP is provided as dry SAP for the present invention, the average particle size of the post-consumer SAP may optionally be reduced, e.g. by milling, grinding or other suitable means. The D50 average particle size of the dry SAP (whether PCR SAP, PIR SAP or virgin made SAP) provided for the present invention may be from 100 µm to 1,000 µm as measured according to ISO method 13322-2. The particle size distribution (PSD) of the of the dry SAP may be from 40 µm to 5,000 µm, or from 50 µm to 2,000, or from 50 µm to 1,000 µm, or from 50 µm to 800 µm.

If the SAP is provided in pre-swollen form, e.g. as post-consumer SAP, which was not or only partly dried after recycling, the SAP may be subjected to comminution to increase the surface area of the SAP, which may enable faster absorption of the aqueous carrier with the salt dissolved therein. Such faster absorption may, in turn, lead to faster degradation of the SAP. Comminution may, for example, be done by wet grinding.

Smaller particles sizes can help fast and homogeneous absorption of the dissolved salt into the SAP, leading to faster and more complete degradation of the SAP.

Optional method step f) of separating the soluble polyacrylic acid polymers in the aqueous solution from other compounds and components in the mixture:

Once the SAP has been decomposed into PAA, the PAA may be separated from the mixture of (possibly remaining non-decomposed) SAP, salt, aqueous carrier and optional further components (such as hydrogen peroxide). The mixture may still comprise a certain amount of non-decomposed SAP, which may be present in the mixture as solid, insoluble component.

The PAA can be extracted from the mixture via a number of processes. Non-limiting examples of these processes are water evaporation, filtration of the PAA, water extraction, etc. Also, the salts can be removed via any desalination technique known to those skilled in the art. Non-limiting examples of desalination processes are membrane processes (e.g. reverse osmosis, forward osmosis, electrodialysis reversal (EDR), nanofiltration, etc.), freezing desalination, solar desalination, geothermal desalination, ion exchange, wave powered desalination, etc. The same techniques can generally also be applied to remove other small molecular weight compounds in the mixture, e.g. other typical compounds of the post-consumer AHPs such as adhesives, inks, dyes, surfactants, and degradation products of these compounds.

For example, filtration may be used to eliminate the solid compounds and components from the mixture, i.e. for method step d) of separating the soluble polyacrylic acid polymers in the aqueous solution from other compounds and components in the mixture obtained by step c). Solid compounds and components may be remaining insoluble SAP and other components of post-consumer AHPs, such as synthetic fibrous materials or films (fibers, sheets/films/fibrous layers) and cellulose. Notably, polyolefins (e.g. polypropylene, polyethylene) comprised by the other components of post-consumer AHPs, such as the synthetic fibrous materials or films, are not soluble or swellable in the aqueous carrier. They may only react with the salt to a negligible extent, i.e. the polyolefins are not or only insignificantly degraded by the method of the present invention. The same apply for PET, which may also be comprised by the synthetic fibrous materials or films. Thus, those materials will remain as solid components in the mixture and may be filtered out.

PEG, another typical component in post-consumer AHPs, e.g. comprised in surfactants, is degraded by the method of the present invention. However, the PEG is typically degraded into molecules of relatively small molecular weight, which is significantly smaller than the molecular weight of the PAA. Hence, the small molecular weight reaction products of PEG can be separated from the soluble PAA polymers, e.g. by the techniques described above.

Alternatively, or in addition, the mixture of PAA, (possibly remaining parts of) SAP, salt and aqueous carrier, which may comprise compounds of post-consumer AHPs, may also be mixed in a co-solvent in which the PAA is not soluble such that the PAA will precipitate to isolate it from the mixture. Prior to such mixing in a co-solvent, solid compounds in the mixture may be removed by filtration.

The PAA obtained by the degradation method of the present invention may have varying molecular weight. The PAA may or may not comprise oligomers. Preferably, the PAA does not comprise oligomers, i.e. PAA relates to polymers only. The average molecular weight Mw of the PAA may be up to 10 MDa, or up to 5 MDa. The average molecular weight Mw of the PAA may be at least 10 kDa, or at least 20 kDa. The PAA may be linear or branched. However, the PAA are not crosslinked and hence they are water-soluble.

The PAA obtained by the method of the present invention can be used or derivatized into materials for other applications such as adhesives, coatings, water treatment, etc. In one embodiment of the present invention, the PAA, either as is or derivatized, is used in an adhesive. In yet another embodiment of the present invention, the PAA, either as is or derivatized, is used in fabric care applications. In even yet another embodiment of the present invention, the PAA, either as is or derivatized, is used in water treatment applications.

In one embodiment of the present invention, the feed stream comprises SAP and an oxidative water-soluble salt; and wherein said salt comprises at least on cation and at least one anion. In another embodiment of the present invention, the feed stream comprises SAP and an oxidative water-soluble salt; wherein said salt comprises at least on cation and at least one anion; and wherein said anion is selected from the group consisting of peroxydisulfate, peroxymonosulfate, peroxydicarbonate, peroxydiphosphate, peroxydiborate, and combinations thereof. In yet another embodiment of the present invention, the feed stream comprises SAP and an oxidative water-soluble salt; wherein said salt comprises at least on cation and at least one anion; wherein said anion is selected from the group consisting of peroxydisulfate, peroxymonosulfate, peroxydicarbonate, peroxydiphosphate, peroxydiborate, and combinations thereof; and wherein said cation is selected from the group consisting of $Li^+$, $Na^+$, $K^+$, $Rb^+$, $Cs^+$, $NH_4^+$, organically substituted ammonium, $Ca^{2+}$, $Mg^{2+}$, $Sr^{2+}$, $Ba^{2+}$, $Al^{3+}$, transition metal cations of 1+ to 3+ oxidation state, and combinations thereof.

In one embodiment of the present invention, the feed stream is subjected to a biological process that results in a negative logarithm of the viscosity ratio between the feed and product streams of higher than about 2. The biological method may entail an enzyme or microorganism that cleave bonds present in the SAP, such as carboxyl ester bonds linking PAA to the poly(ethylene glycol) (PEG) cross-linker or ether bonds present in the PEG cross-linker. The breakdown of such bonds may result in a reduction of the viscosity of the feed stream and may allow increased flow rates and/or decreased pressure as the feed stream flows in the extensional flow device.

In one embodiment of the present invention, the feed stream comprises SAP and an enzyme; and wherein said enzyme has activity against said SAP. Non-limiting examples of enzymes are hydrolases and oxidases. Non-limiting examples of hydrolases are ester hydrolases, carboxyl ester hydrolases, ether hydrolases, cutinases, lipases, esterases, and carboyl-esterases. In another embodiment of the present invention, the feed stream comprises SAP and an ester hydrolase. In yet another embodiment of the present invention, the feed stream comprises SAP and an ether hydrolase. Non-limiting examples of oxidases are peroxidases, peroxygenases, laccases, lipoxygenases, peroxidases, peroxygenases, mono-oxygenases, di-oxygenases, and hydroxilases. In even yet another embodiment of the present invention, the enzyme is a cocktail of enzymes. In one embodiment of the present invention, the feed stream comprises SAP, an enzyme, and one or more of a cofactor, a co-substrate, and a supplement.

In another embodiment of the present invention, the feed stream comprises SAP and a cocktail of enzymes. In yet another embodiment of the present invention, the feed stream comprises SAP and an enzyme; wherein said enzyme contains multiple catalytic activities; and wherein said activities are selected from the group consisting of carboxyl esterase, ether hydrolase, and oxidase. The enzymes can be naturally occurring or engineered to improve properties, such as substrate specificity, turnover, temperature stability, and pH stability. For example, hydrogen peroxide may be added to peroxidase family enzymes or electron-shuttle compounds such as, but not limited to, 1-Hydroxybenzotriazole (HBT, synthesis grade), N-hydroxynaphthalimide (IMD-4, 99%), N-hydroxy-5-norbornene-2,3-dicarboxylic acid imide (NHND, 97%), N-hydroxyphthalimide (NPI, 97%), 2,2'-Azino-bis(3-ethylbenzothiazoline-6-sulfonic acid), AB TS, or N,N'-Dihydroxy-1,4,5,8-naphthalimide, IMD-8.

Non-limiting examples of bacterial microorganisms that break down SAP in the feed stream are *Bacillus cereus, Pseudomonas aureginosa, P. fluorescens, P. stutzeri*, and *Alcaligenes glycovorans*. A non-limiting example of fungal microorganisms that break down SAP is *Phanerochaete chrysosporium*. In another embodiment of this invention, a combination or consortium of organisms such as those listed herein is utilized to breakdown the polymer in the feed stream. Without wishing to be bound by any theory, applicants believe that the microorganisms used in the biological treatment express and produce at least one enzyme, such as the enzyme examples listed herein that act on specific bonds of the SAP in the feed stream. The organisms may also produce cofactors, co-substrates, and/or allosteric modulators that enhance the enzymatic activity.

IV Product Stream

The feed stream flows into the inlet of the extensional device and produces a product stream at the outlet of the extensional flow device. In one embodiment of the present invention, the product stream comprises PAA. In another embodiment of the present invention, the product stream comprises PAA and SAP.

In one embodiment of the present invention, the PAA has a weight-average molecular weight less than about 5,000,000 g/mol. In another embodiment of the present invention, the PAA has a weight-average molecular weight less than about 2,000,000 g/mol. In yet another embodiment of the present invention, the PAA has a weight-average molecular weight less than about 1,000,000 g/mol. In even yet another embodiment of the present invention, the PAA has a weight-average molecular weight less than about 500,000 g/mol. In one embodiment of the present invention, the PAA has a weight-average molecular weight less than about 300,000 g/mol. In another embodiment of the present invention, the PAA has a weight-average molecular weight less than about 200,000 g/mol. In yet another embodiment of the present invention, the PAA has a weight-average molecular weight less than about 100,000 g/mol. In even yet another embodiment of the present invention, the PAA has a weight-average molecular weight less than about 30,000 g/mol.

In one embodiment of the present invention, the PAA has a weight-average molecular weight between about 1,000,000 g/mol and about 5,000,000 g/mol. In another embodiment of the present invention, the PAA has a weight-average molecular weight between about 500,000 g/mol and about 2,000,000 g/mol. In yet another embodiment of the present invention, the PAA has a weight-average molecular weight between about 100,000 g/mol and about 1,000,000 g/mol. In even yet another embodiment of the present invention, the PAA has a weight-average molecular weight between about 150,000 g/mol and about 500,000 g/mol. In one embodiment of the present invention, the PAA has a weight-average molecular weight between about 90,000 g/mol and about 300,000 g/mol. In another embodiment of the present invention, the PAA has a weight-average molecular weight between about 20,000 g/mol and about 200,000 g/mol. In yet another embodiment of the present invention, the PAA has a weight-average molecular weight between about 10,000 g/mol and about 100,000 g/mol.

In one embodiment of the present invention, the PAA has a polydispersity index (PDI) less than about 10. In another embodiment of the present invention, the PAA has a PDI less than about 6. In yet another embodiment of the present invention, the PAA has a PDI less than about 4. In even yet another embodiment of the present invention, the PAA has a PDI less than about 2. PDI is the ratio of the weight-average molecular weight to the number-average molecular weight, and these molecular weights are measured by GPC (described in the Methods section VII) as it is known to those skilled in the art.

The viscosity of the product stream is typically measured with either a parallel plate fixture in oscillatory mode or a cup and bob fixture in steady mode. The oscillatory viscosity reported typically corresponds to 1 rad/s, and the steady viscosity reported typically corresponds to a shear rate of 4 $s^{-1}$. Depending on the PAA concentration and molecular weight, the viscosity of the product stream can be as low as 1 mPa·s (or equivalently, 1 cP; i.e., the viscosity of water).

The ratio of the viscosity of the product stream to the viscosity of the feed stream is the viscosity reduction ratio (or simply, viscosity ratio). It indicates the extent of the SAP degradation to PAA by the UV flow system. The negative logarithm of the viscosity ratio measures the orders of magnitude change between the viscosity of the feed stream and the product stream. In one embodiment of the present invention, the feed stream has a viscosity; the product stream has a viscosity; the ratio of the viscosity of the product stream to the viscosity of the feed stream is the viscosity ratio; and the negative logarithm of said viscosity ratio is less than about 6. In another embodiment of the present invention, the feed stream has a viscosity; the product stream has a viscosity; the ratio of the viscosity of the product stream to the viscosity of the feed stream is the viscosity ratio; and the negative logarithm of said viscosity ratio is less than about 4. In yet another embodiment of the present invention, the feed stream has a viscosity; the product stream has a viscosity; the ratio of the viscosity of the product stream to the viscosity of the feed stream is the viscosity ratio; and the negative logarithm of said viscosity ratio is less than about 2.

PAA from the product stream can be derivatized into materials for various applications, such as, adhesives, coatings, water treatment, etc. In one embodiment of the present invention, PAA from the product stream, either as is or derivatized, is used as an adhesive. In yet another embodiment of the present invention, PAA from the product stream, either as is or derivatized, is used in fabric care applications. In even yet another embodiment of the present invention, PAA from the product stream, either as is or derivatized, is used in water treatment applications.

In one embodiment of the present invention, PAA from the product stream is used as a ply glue in paper products. In another embodiment of the present invention, PAA from the product stream is used as a ply glue in paper towel products. In yet another embodiment of the present invention, PAA from the product stream is used as a ply glue in toilet paper products. In even yet another embodiment of the present invention, PAA from the product stream is used as ply glue in paper products has $M_w$ greater than about 350 kDa. In one embodiment of the present invention, PAA from the product stream is used as ply glue in paper products has $M_w$ between about 400 kDa and about 500 kDa.

In another embodiment of the present invention, PAA from the product stream is used as a glue between the paper core and paper towel products. In even another embodiment of the present invention, PAA from the product stream is used as a glue between the paper core and toilet paper products.

PAA can be extracted from the product stream via a number of processes. Non-limiting examples of these processes are water evaporation, PAA filtration, water extraction, etc. Also, salts present in the product stream from the use of SAP in AHPs can be removed via any desalination technique known to those skilled in the art. Non-limiting examples of desalination processes are membrane processes (e.g. reverse osmosis, forward osmosis, electrodialysis reversal (EDR), nanofiltration, etc.), freezing desalination, solar desalination, geothermal desalination, ion exchange, wave powered desalination, etc.

V Recycled SAP

PAA from the product stream can be fed into the process to make SAP from glacial acrylic acid, thus producing recycled SAP. EXAMPLES 21 and 23 show the incorporation of PAA into virgin SAP. In one embodiment of the present invention, the PAA is used to produce a recycled SAP.

In one embodiment of the present invention, the SAP comprises PAA at a concentration, and wherein the PAA concentration is less than about 60 wt %. In another embodiment of the present invention, the SAP comprises PAA at a concentration, and wherein the PAA concentration is less than about 50 wt %. In yet another embodiment of the present invention, the SAP comprises PAA at a concentration, and wherein the PAA concentration is less than about 45 wt %. In even yet another embodiment of the present invention, the SAP comprises PAA at a concentration, and wherein the PAA concentration is less than about 40 wt %. In one embodiment of the present invention, the SAP comprises PAA at a concentration, and wherein the PAA concentration is less than about 30 wt %. In another embodiment of the present invention, the SAP comprises PAA at a concentration, and wherein the PAA concentration is less than about 20 wt %. In yet another embodiment of the present invention, the SAP comprises PAA at a concentration, and wherein the PAA concentration is less than about 15 wt %. In even yet another embodiment of the present invention, the SAP comprises PAA at a concentration, and wherein the PAA concentration is less than about 10 wt %.

In one embodiment of the present invention, the recycled SAP has an amount of extractables, and wherein the amount of extractables is less than about 20 wt %. In another embodiment of the present invention, the recycled SAP has an amount of extractables, and wherein the amount of extractables is less than about 15 wt %. In yet another embodiment of the present invention, the recycled SAP has an amount of extractables, and wherein the amount of extractables is less than about 10 wt %. In even yet another embodiment of the present invention, the recycled SAP has an amount of extractables, and wherein the amount of extractables is less than about 7 wt %.

In one embodiment of the present invention, the recycled SAP has a swelling ratio, and wherein the swelling ratio is greater than about 50 g/g. In another embodiment of the present invention, the recycled SAP has a swelling ratio, and wherein the swelling ratio is greater than about 45 g/g. In yet another embodiment of the present invention, the recycled SAP has a swelling ratio, and wherein the swelling ratio is greater than about 40 g/g. In even yet another embodiment of the present invention, the recycled SAP has a swelling ratio, and wherein the swelling ratio is greater than about 35 g/g.

In one embodiment of the present invention, the recycled SAP has a swelling ratio, and wherein the swelling ratio is about 50 g/g. In another embodiment of the present invention, the recycled SAP has a swelling ratio, and wherein the swelling ratio is about 45 g/g. In yet another embodiment of the present invention, the recycled SAP has a swelling ratio, and wherein the swelling ratio is about 42 g/g. In even yet another embodiment of the present invention, the recycled SAP has a swelling ratio, and wherein the swelling ratio is about 40 g/g.

In one embodiment of the present invention, the recycled SAP has a CRC, and wherein the CRC is between about 20 g/g and about 45 g/g. In another embodiment of the present invention, the recycled SAP has a CRC, and wherein the CRC is between about 25 g/g and about 40 g/g. In yet another embodiment of the present invention, the recycled SAP has a CRC, and wherein the CRC is between about 30 g/g and about 35 g/g.

In one embodiment of the present invention, the recycled SAP has an AAP, and wherein said AAP is between about 15 g/g and about 40 g/g. In another embodiment of the present invention, the recycled SAP has an AAP, and wherein said AAP is between about 20 g/g and about 35 g/g. In yet another embodiment of the present invention, the recycled SAP has an AAP, and wherein said AAP is between about 25 g/g and about 30 g/g.

VI Examples

Unless otherwise noted, the SAP used in the EXAMPLES below is denoted as "GIC 31187", came from the Procter & Gamble Co. (Cincinnati, Ohio), was prepared according to the procedure described in the Methods section VII, had particle size between 63 and 150 μm, DN of 68 mol %, and its typical properties are shown in the Methods section VII.

Inventive EXAMPLES 1 to 5 show that the negative logarithm of the viscosity ratio of the product stream to the feed stream (i.e., orders of magnitude reduction in the product stream viscosity relative to the feed stream viscosity) increases with residence time in the LW (no hydrodynamic cavitation) for the 2.5 wt % SAP and 97.5 wt % RO water feed stream. The results from these inventive EXAMPLES are also shown in TABLE 1 and FIG. 1.

Example 1

Figure 5:
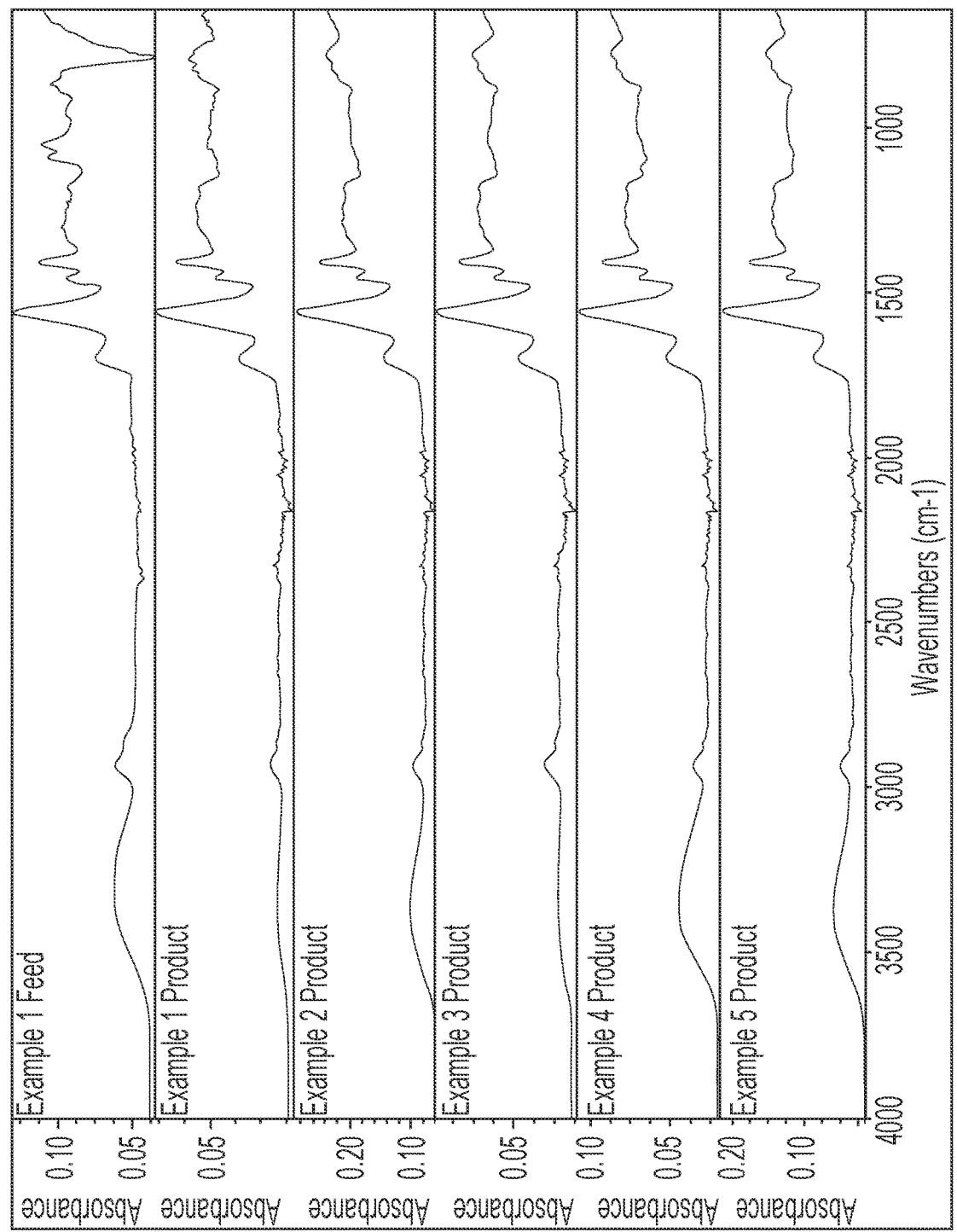
FIG. 5 is a graph showing FTIR spectra of feed stream SAP (EXAMPLE 1) and product stream PAAs (EXAMPLES 1 to 5) acquired by Thermo Scientific™ Nicolet™ iS50 FT-IR Spectrometer (Golden Gate KRSS ATR with diamond crystal, ZnSe lenses). $COO^-$ (sym) is shown at about 1400 $cm^{-1}$ and $COO^-$ (antisym) is shown at about 1600 $cm^{-1}$ for neutralized PAA; and C=O is shown at about 1700 $cm^{-1}$ for non-neutralized PAA (see Kirwan, L. J., et al., Langmuir, 19 (2003), 5802-5807).

SAP was mixed with RO water overnight to produce a feed stream (in the form of a gel) with 2.5 wt % SAP and 97.5 wt % RO water. 400 mL of the feed stream were loaded in the Liquid Whistle apparatus (LW; Model-A Sonolator; Sonic Corp., Stratford, Conn.; ellipsoidal orifice dimensions: width is 2×0.0375 in.=1.9 mm, height is 2×0.012 in.=0.6 mm (hydraulic diameter is calculated as 1.7 mm), land length is 1 mm, and volume V=π×(width)×(height)× (land length)/4=0.9 mm$^3$), run through it with flowrate of about 4899 mL/min and pressure of about 4945 psi (about 341 bar), and the product stream was collected into a beaker. The stainless-steel blade was placed about 10.7 mm away from the LW orifice, and since that distance was more than 6 times the hydraulic diameter of the orifice it was considered that the blade did not cause any significant cavitation. The residence time of the feed stream in the LW was about 4.9 s, and the residence time of the feed stream in the orifice was about 11 ms. At those conditions, the total energy was about 2.10 MJ/kg SAP and the specific energy was 1.36 MJ/kg SAP (thus, the energy efficiency of the LW is about 1.36/2.1=64.8%). The viscosity of the feed and product streams was measured with a parallel plate fixture in oscillatory mode. The complex viscosity of the feed stream at 1 rad/s was measured as 672.4 Pa·s and that of the product stream at 1 rad/s was measured as 109.9 Pa·s. Thus, the viscosity ratio of the two streams was 1.63×10$^{-1}$, and its negative logarithm was 0.79. PAA in the product stream was not decarboxylated as shown in FIG. 5. The PAA in the product stream was analyzed using the MWD Analysis described in the Methods section VII and yielded the following values: $M_n$=1082 kDa; $M_w$=1680 kDa; and PDI=1.6.

Example 2

The feed stream for this EXAMPLE 2 was the product stream of EXAMPLE 1. 400 mL of the feed stream were loaded in the equipment of EXAMPLE 1 and run as a 2$^{nd}$ pass with flowrate of about 4899 mL/min and pressure of about 4341 psi (299.3 bar). The residence time of the feed stream in the LW was about 4.9 s. The cumulative (for passes 1 and 2) residence time of the feed stream was about 9.2 s. The total energy was calculated as 1.92 MJ/kg SAP, the cumulative (for passes 1 and 2) total energy was calculated as 4.02 MJ/kg SAP, the specific energy was calculated as 1.20 MJ/kg SAP, the cumulative (for passes 1 and 2) specific energy was calculated as 2.56 MJ/kg SAP, and thus the energy efficiency of the LW for passes 1 and 2 was calculated as 2.56/4.02=63.7%. The viscosity of the product stream was measured with a parallel plate fixture in oscillatory mode, and at 1 rad/s it was measured as 38.7 Pa·s. Thus, the viscosity ratio of the two streams was 5.76×10$^{-2}$, and its negative logarithm was 1.24. PAA in the product stream was not decarboxylated as shown in FIG. 5. The PAA in the product stream had: $M_n$=750 kDa; $M_w$=1120 kDa; and PDI=1.5.

Example 3

The feed stream for this EXAMPLE 3 was the product stream of EXAMPLE 2. 400 mL of the feed stream were loaded in the equipment of EXAMPLE 1 and run as a 3$^{rd}$ pass with flowrate of about 4899 mL/min and pressure of about 4195 psi (289.2 bar). The residence time of the feed stream in the LW was about 4.9 s. The cumulative (for passes 1 to 3) residence time of the feed stream was about 13.8 s. The total energy was calculated as 1.89 MJ/kg SAP, the cumulative (for passes 1 to 3) total energy was calculated as 5.91 MJ/kg SAP, the specific energy was calculated as 1.16 MJ/kg SAP, the cumulative (for passes 1 to 3) specific energy was calculated as 3.72 MJ/kg SAP, and thus the energy efficiency of the LW for passes 1 to 3 was calculated as 3.72/5.91=62.9%. The viscosity of the product stream was measured with a parallel plate fixture in oscillatory mode, and at 1 rad/s it was measured as 15.2 Pa·s. Thus, the viscosity ratio of the two streams was 2.26×10$^{-2}$, and its negative logarithm was 1.65. The PAA in the product stream was not decarboxylated as shown in FIG. 5. The PAA in the product stream had: $M_n$=1254 kDa; $M_w$=1566 kDa; and PDI=1.2.

Example 4

The feed stream for this EXAMPLE 4 was the product stream of EXAMPLE 3. 300 mL of the feed stream were loaded in the equipment of EXAMPLE 1 and run as a 4$^{th}$ pass with flowrate of about 4899 mL/min and pressure of about 4143 psi (285.6 bar). The residence time of the feed stream in the LW was about 3.7 s. The cumulative (for passes 1 to 4) residence time of the feed stream was about 17.5 s. The LW total energy was calculated as 1.86 MJ/kg SAP, the cumulative (for passes 1 to 4) LW total energy was calculated as 7.77 MJ/kg SAP, the specific energy was calculated as 1.14 MJ/kg SAP, the cumulative (for passes 1 to 4) specific energy was calculated as 4.86 MJ/kg SAP, and thus the energy efficiency of the LW for passes 1 to 4 was calculated as 4.86/7.77=62.5%. The viscosity of the product stream was measured with a cup and bob fixture in steady mode, and at 4 s$^{-1}$ it was measured as 6.31 Pa·s. Thus, the viscosity ratio of the two streams was 9.38×10$^{-3}$, and its negative logarithm was 2.03. The PAA in the product stream was not decarboxylated as shown in FIG. 5. The PAA in the product stream had: $M_n$=1419 kDa; $M_w$=1697 kDa; and PDI=1.2.

Example 5

The feed stream for this EXAMPLE 5 was the product stream of EXAMPLE 4. 300 mL of the feed stream were loaded in the equipment of EXAMPLE 1 and run as a 5$^{th}$ pass with flowrate of about 4899 mL/min and pressure of about 4101 psi (282.8 bar). The residence time of the feed stream in the LW was about 3.7 s. The cumulative (for passes 1 and 2) residence time of the feed stream was about 21.2 s. The LW total energy was calculated as 1.85 MJ/kg SAP, the cumulative (for passes 1 to 5) LW total energy was calculated as 9.62 MJ/kg SAP, the specific energy was calculated as 1.13 MJ/kg SAP, the cumulative (for passes 1 to 5) specific energy was calculated as 5.99 MJ/kg SAP, and thus the energy efficiency of the LW for passes 1 to 4 was calculated as 5.99/9.62=62.3%. The viscosity of the product stream was measured with a cup and bob fixture in steady mode, and at 4 s$^{-1}$ it was measured as 3.23 Pa·s. Thus, the viscosity ratio of the two streams was 4.8×10$^{-3}$, and its negative logarithm was 2.32. PAA in the product stream was not decarboxylated as shown in FIG. 5. The PAA in the product stream had: $M_n$=1318 kDa; $M_w$=1653 kDa; and PDI=1.3.

Figure 2:
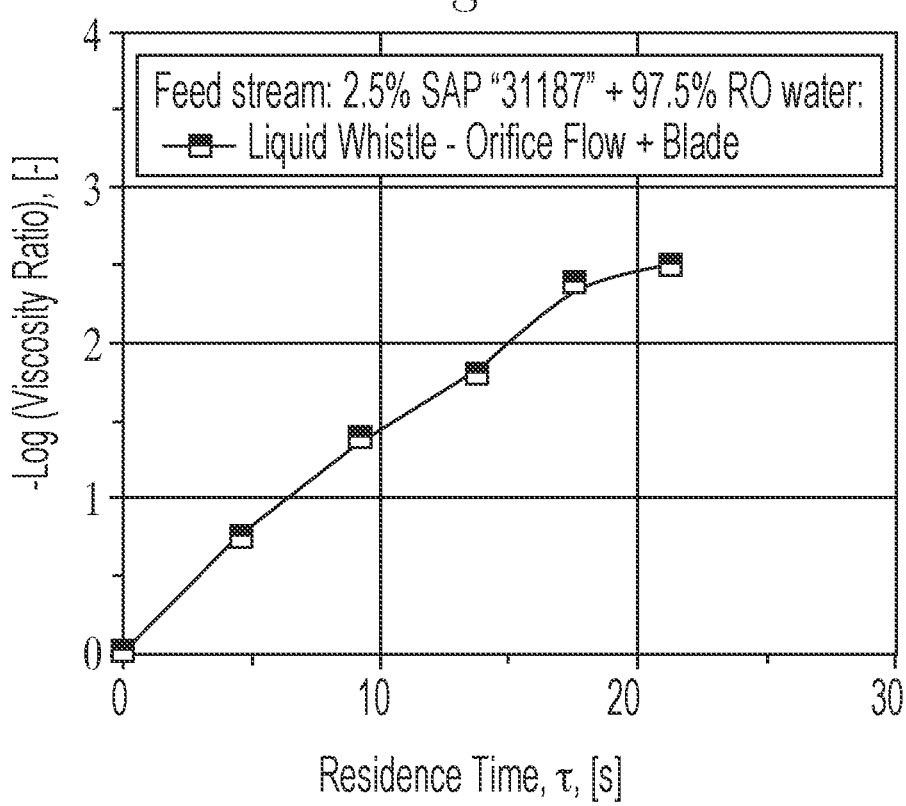
FIG. 2 is a graph showing the negative logarithm of the viscosity ratio between the feed and product streams as a function of the residence time of the feed stream in the Liquid Whistle, with the orifice and hydrodynamic cavitation (i.e., the blade was engaged), and for the 2.5 wt % and 97.5 wt % RO water feed stream.

Inventive EXAMPLES 6 to 10 show that the negative logarithm of the viscosity ratio of the product stream to the feed stream (i.e., orders of magnitude reduction in the product stream viscosity relative to the feed stream viscosity) increases with residence time in the LW (with hydrodynamic cavitation) for the 2.5 wt % SAP and 97.5 wt % RO water feed stream. The results from these inventive EXAMPLES are also shown in TABLE 1 and FIG. 2.

Example 6

Figure 6:
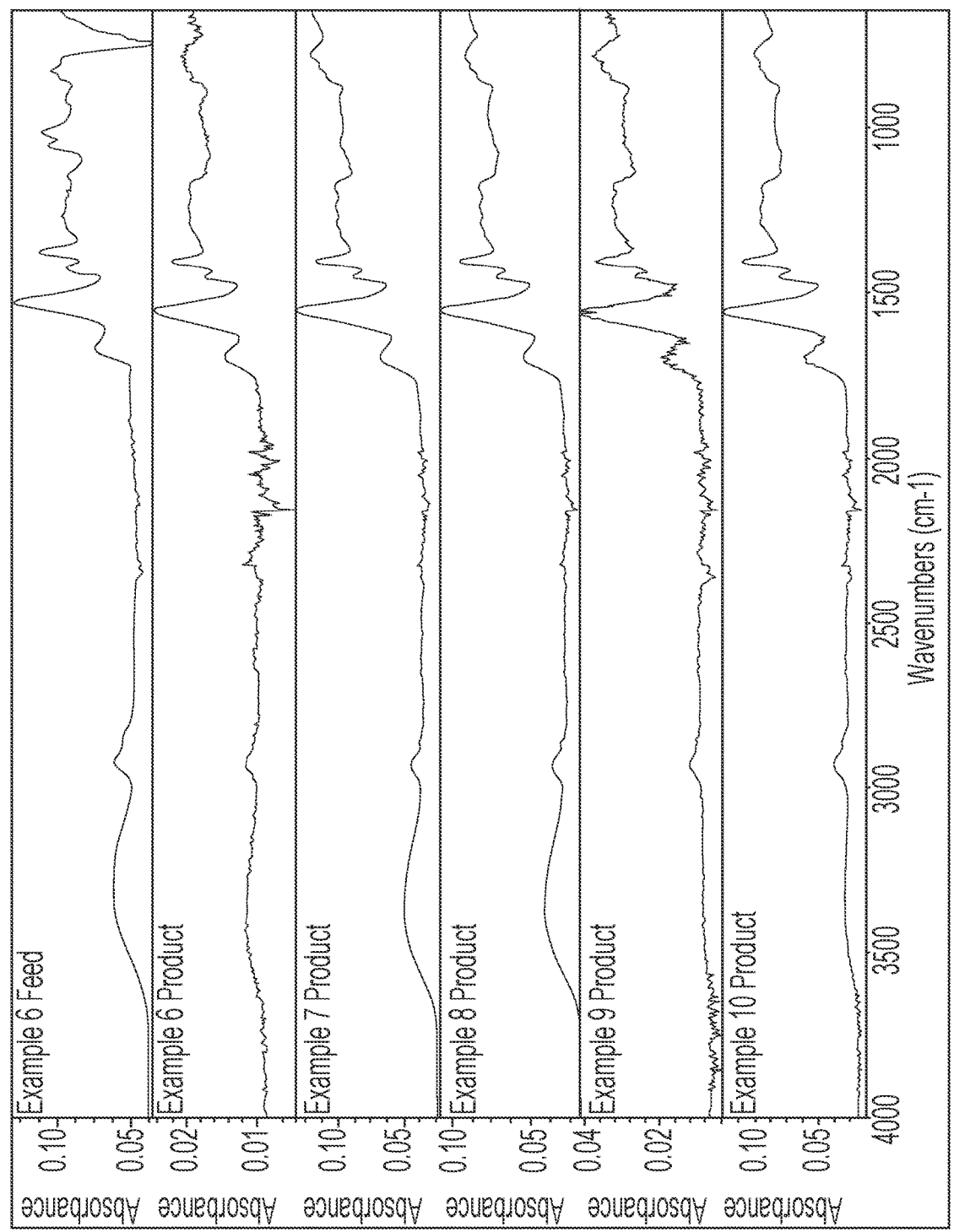
FIG. 6 is a graph showing FTIR spectra of feed stream SAP (EXAMPLE 6) and product stream PAAs (EXAMPLES 6 to 10) acquired by Thermo Scientific™ Nicolet™ iS50 FT-IR Spectrometer (Golden Gate KRSS ATR with diamond crystal, ZnSe lenses). $COO^-$ (sym) is shown at about 1400 $cm^{-1}$ and $COO^-$ (antisym) is shown at about 1600 $cm^{-1}$ for neutralized PAA; and C=O is shown at about 1700 $cm^{-1}$ for non-neutralized PAA (see Kirwan, L. J., et al., Langmuir, 19 (2003), 5802-5807).

The feed stream for this EXAMPLE 6 was the same as the feed stream of EXAMPLE 1, and it was run in the same apparatus and with the same conditions of EXAMPLE 1 (i.e., flowrate, pressure, total energy, and specific energy). The only difference in the apparatus of EXAMPLE 1 was that the stainless-steel blade was placed 0.5 mm away from the LW orifice in this EXAMPLE 6 (i.e., that distance was 0.3 times the hydraulic diameter of the orifice and thus cavitation was expected to happen). The viscosity of the feed and product streams was measured with a parallel plate fixture in oscillatory mode. The complex viscosity of the feed stream at 1 rad/s was measured as 648.2 Pa·s and that of the product stream at 1 rad/s was measured as 115.7 Pa·s. Thus, the viscosity ratio of the two streams was 1.78×10$^{-1}$, and its negative logarithm was 0.75. PAA in the product stream was not decarboxylated as shown in FIG. 6. The PAA in the product stream had: $M_n$=646 kDa; $M_w$=939 kDa; and PDI=1.5.

Example 7

The feed stream for this EXAMPLE 7 was the product stream of EXAMPLE 6, and it was run in the same apparatus and with the same conditions of EXAMPLE 2 (i.e., flowrate, pressure, total energy, and specific energy). The only difference in the apparatus of EXAMPLE 2 was that a stainless-steel blade was placed 0.5 mm away from the LW orifice in this EXAMPLE 7. The viscosity of the product stream was measured with a parallel plate fixture in oscillatory mode, and at 1 rad/s it was measured as 26.9 Pa·s. Thus, the viscosity ratio of the two streams was 4.15×10$^{-2}$, and its negative logarithm was 1.38. PAA in the product stream was not decarboxylated as shown in FIG. 6. The PAA in the product stream had: $M_n$=814 kDa; $M_w$=1308 kDa; and PDI=1.6.

Example 8

The feed stream for this EXAMPLE 8 was the product stream of EXAMPLE 7, and it was run in the same apparatus and with the same conditions of EXAMPLE 3 (i.e., flowrate, pressure, total energy, and specific energy). The only difference in the apparatus of EXAMPLE 3 was that a stainless-steel blade was placed 0.5 mm away from the LW orifice in this EXAMPLE 8. The viscosity of the product stream was measured with a parallel plate fixture in oscillatory mode, and at 1 rad/s it was measured as 10.8 Pa·s. Thus, the viscosity ratio of the two streams was 1.67×10$^{-2}$, and its negative logarithm was 1.78. PAA in the product stream was not decarboxylated as shown in FIG. 6. The PAA in the product stream had: $M_n$=1026 kDa; $M_w$=1498 kDa; and PDI=1.4.

Example 9

The feed stream for this EXAMPLE 9 was the product stream of EXAMPLE 8, and it was run in the same apparatus and with the same conditions of EXAMPLE 4 (i.e., flowrate, pressure, total energy, and specific energy). The only difference in the apparatus of EXAMPLE 4 was that a stainless-steel blade was placed 0.5 mm away from the LW orifice in this EXAMPLE 9. The viscosity of the product stream was measured with a cup and bob fixture in steady mode, and at 4 s$^{-1}$ it was measured as 2.75 Pa·s. Thus, the viscosity ratio of the two streams was 4.24×10$^{-3}$, and its negative logarithm was 2.37. The PAA in the product stream was not decarboxylated as shown in FIG. 6. The PAA in the product stream had: $M_n$=1277 kDa; $M_w$=1532 kDa; and PDI=1.2.

Example 10

The feed stream for this EXAMPLE 10 was the product stream of EXAMPLE 9, and it was run in the same apparatus and with the same conditions of EXAMPLE 5 (i.e., flowrate, pressure, total energy, and specific energy). The only difference in the apparatus of EXAMPLE 5 was that a stainless-steel blade was placed 0.5 mm away from the LW orifice in this EXAMPLE 10. The viscosity of the product stream was measured with a cup and bob fixture in steady mode, and at 4 s$^{-1}$ it was measured as 2.1 Pa·s. Thus, the viscosity ratio of the two streams was 3.24×10$^{-3}$, and its negative logarithm was 2.49. PAA in the product stream was not decarboxylated as shown in FIG. 6. The PAA in the product stream had: $M_n$=1434 kDa; $M_w$=1703 kDa; and PDI=1.2.

Figure 3:
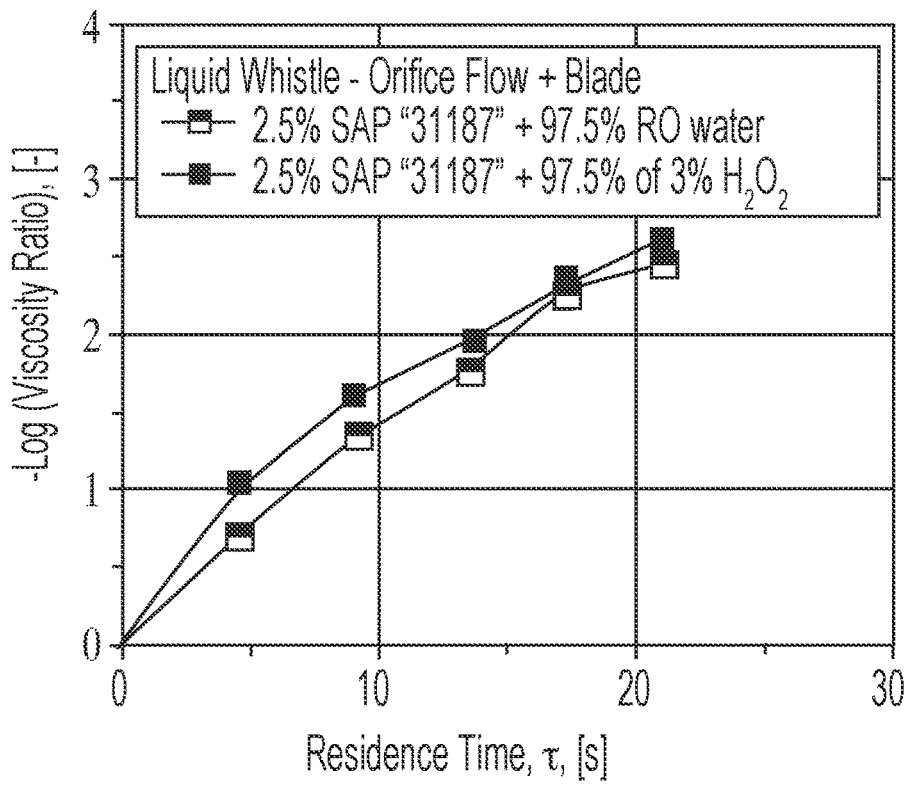
FIG. 3 is a graph showing the negative logarithm of the viscosity ratio between the feed and product streams as a function of the residence time of the feed stream in the Liquid Whistle, with the orifice and hydrodynamic cavitation (i.e., the blade was engaged), and for the feed streams: 2.5 wt % SAP and 97.5 wt % RO water, and 2.5 wt % SAP and 97.5 wt % of 3 wt % $H_2O_2$ solution.

Inventive EXAMPLES 11 to 15 show that the negative logarithm of the viscosity ratio of the product stream to the feed stream (i.e., orders of magnitude reduction in the product stream viscosity relative to the feed stream viscosity) increases with residence time in the LW (no hydrodynamic cavitation) for the 2.5 wt % SAP and 97.5 wt % of a 3 wt % $H_2O_2$ solution. The results from these inventive EXAMPLES are also shown in TABLE 1 and FIG. 3.

Example 11

A feed stream with 2.5 wt % SAP and 97.5 wt % of a 3 wt % hydrogen peroxide solution was prepared as in EXAMPLE 1, and it was run in the same apparatus and with the same conditions of EXAMPLE 1 (i.e., flowrate, pressure, total energy, and specific energy). The viscosity of the feed and product streams was measured with a parallel plate fixture in oscillatory mode. The complex viscosity of the feed stream at 1 rad/s was measured as 628.6 Pa·s and that of the product stream at 1 rad/s was measured as 78 Pa·s. Thus, the viscosity ratio of the two streams was 1.24×10$^{-1}$, and its negative logarithm was 0.91. The PAA in the product stream had: $M_n$=373 kDa; $M_w$=624 kDa; and PDI=1.7.

Example 12

The feed stream for this EXAMPLE 12 was the product stream of EXAMPLE 11, and it was run in the same apparatus and with the same conditions of EXAMPLE 2 (i.e., flowrate, pressure, total energy, and specific energy). The viscosity of the product stream was measured with a parallel plate fixture in oscillatory mode, and at 1 rad/s it was measured as 28.6 Pa·s. Thus, the viscosity ratio of the two streams was $4.55\times10^{-2}$, and its negative logarithm was 1.34. The PAA in the product stream had: $M_n$=666 kDa; $M_w$=1005 kDa; and PDI=1.5.

Example 13

The feed stream for this EXAMPLE 13 was the product stream of EXAMPLE 12, and it was run in the same apparatus and with the same conditions of EXAMPLE 3 (i.e., flowrate, pressure, total energy, and specific energy). The viscosity of the product stream was measured with a parallel plate fixture in oscillatory mode, and at 1 rad/s it was measured as 10.6 Pa·s. Thus, the viscosity ratio of the two streams was $1.69\times10^{-2}$, and its negative logarithm was 1.77. The PAA in the product stream had: $M_n$=833 kDa; $M_w$=1208 kDa; and PDI=1.4.

Example 14

The feed stream for this EXAMPLE 14 was the product stream of EXAMPLE 13, and it was run in the same apparatus and with the same conditions of EXAMPLE 4 (i.e., flowrate, pressure, total energy, and specific energy). The viscosity of the product stream was measured with a parallel plate fixture in oscillatory mode, and at 1 rad/s it was measured as 3.9 Pa·s. Thus, the viscosity ratio of the two streams was $6.20\times10^{-3}$, and its negative logarithm was 2.21. The PAA in the product stream had: $M_n$=891 kDa; $M_w$=1239 kDa; and PDI=1.4.

Example 15

The feed stream for this EXAMPLE 15 was the product stream of EXAMPLE 14, and it was run in the same apparatus and with the same conditions of EXAMPLE 5 (i.e., flowrate, pressure, total energy, and specific energy). The viscosity of the product stream was measured with a cup and bob fixture in steady mode, and at 4 $s^{-1}$ it was measured as 2.1 Pa·s. Thus, the viscosity ratio of the two streams was $3.34\times10^{-3}$, and its negative logarithm was 2.48. The PAA in the product stream had: $M_n$=967 kDa; $M_w$=1332 kDa; and PDI=1.4.

Figure 4:
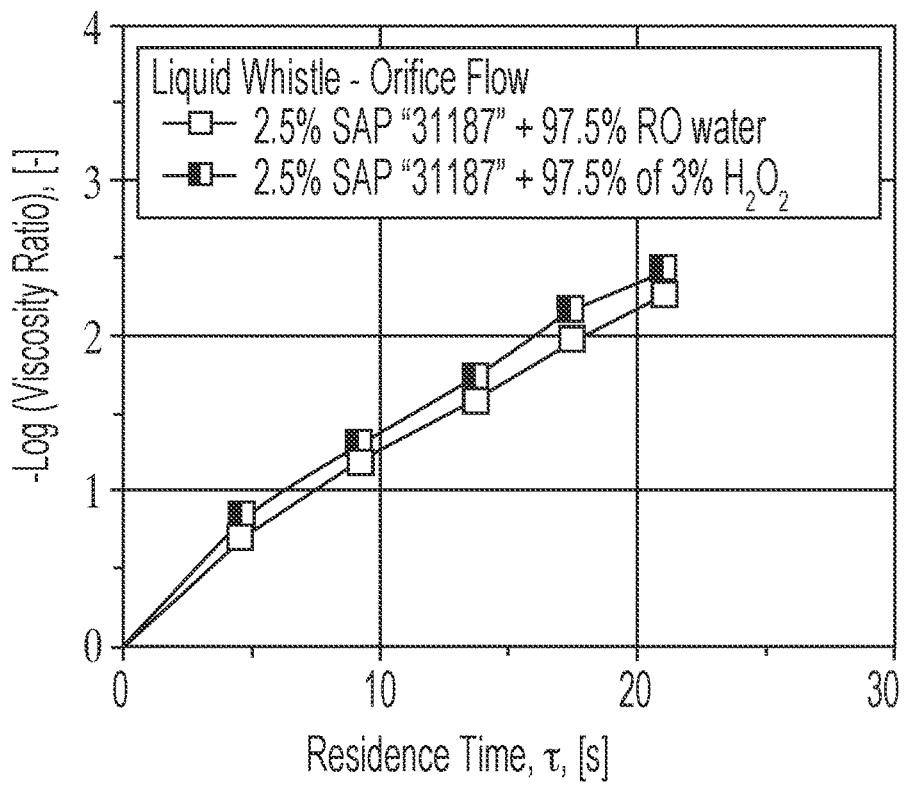
FIG. 4 is a graph showing the negative logarithm of the viscosity ratio between the feed and product streams as a function of the residence time of the feed stream in the Liquid Whistle, with only the orifice and without hydrodynamic cavitation (i.e., the blade was not engaged), and for the feed streams: 2.5 wt % SAP and 97.5 wt % RO water, and 2.5 wt % SAP and 97.5 wt % of 3 wt % $H_2O_2$ solution.

Inventive EXAMPLES 16 to 20 show that the negative logarithm of the viscosity ratio of the product stream to the feed stream (i.e., orders of magnitude reduction in the product stream viscosity relative to the feed stream viscosity) increases with residence time in the LW (with hydrodynamic cavitation) for the 2.5 wt % SAP and 97.5 wt % of a 3 wt % $H_2O_2$ solution. The results from these inventive EXAMPLES are also shown in TABLE 1 and FIG. 4.

Example 16

The feed stream for this EXAMPLE 16 was the same as the feed stream of EXAMPLE 11, and it was run in the same apparatus and with the same conditions of EXAMPLE 6 (i.e., flowrate, pressure, total energy, and specific energy). The viscosity of the feed and product streams was measured with a parallel plate fixture in oscillatory mode. The complex viscosity of the feed stream at 1 rad/s was measured as 628.6 Pa·s and that of the product stream at 1 rad/s was measured as 51.7 Pa·s. Thus, the viscosity ratio of the two streams was $8.11\times10^{-2}$, and its negative logarithm was 1.08. The PAA in the product stream had: $M_n$=525 kDa; $M_w$=849 kDa; and PDI=1.6.

Example 17

The feed stream for this EXAMPLE 17 was the product stream of EXAMPLE 16, and it was run in the same apparatus and with the same conditions of EXAMPLE 7 (i.e., flowrate, pressure, total energy, and specific energy). The viscosity of the product stream was measured with a parallel plate fixture in oscillatory mode, and at 1 rad/s it was measured as 14.5 Pa·s. Thus, the viscosity ratio of the two streams was $2.31\times10^{-2}$, and its negative logarithm was 1.64. The PAA in the product stream had: $M_n$=792 kDa; $M_w$=1162 kDa; and PDI=1.5.

Example 18

The feed stream for this EXAMPLE 18 was the product stream of EXAMPLE 17, and it was run in the same apparatus and with the same conditions as in EXAMPLE 8 (i.e., flowrate, pressure, total energy, and specific energy). The viscosity of the product stream was measured with a parallel plate fixture in oscillatory mode, and at 1 rad/s it was measured as 6.68 Pa·s. Thus, the viscosity ratio of the two streams was $1.06\times10^{-2}$, and its negative logarithm was 1.97. The PAA in the product stream had: $M_n$=1074 kDa; $M_w$=1405 kDa; and PDI=1.3.

Example 19

The feed stream for this EXAMPLE 19 was the product stream of EXAMPLE 18, and it was run in the same apparatus and with the same conditions as in EXAMPLE 9 (i.e., flowrate, pressure, total energy, and specific energy). The viscosity of the product stream was measured with a parallel plate fixture in oscillatory mode, and at 1 rad/s it was measured as 2.96 Pa·s. Thus, the viscosity ratio of the two streams was $4.71\times10^{-3}$, and its negative logarithm was 2.33. The PAA in the product stream had: $M_n$=1074 kDa; $M_w$=1406 kDa; and PDI=1.3.

Example 20

The feed stream for this EXAMPLE 20 was the product stream of EXAMPLE 19, and it was run in the same apparatus and with the same conditions as in EXAMPLE 10 (i.e., flowrate, pressure, total energy, and specific energy). The viscosity of the product stream was measured with a cup and bob fixture in steady mode, and at 4 $s^{-1}$ it was measured as 1.4 Pa·s. Thus, the viscosity ratio of the two streams was $2.23\times10^{-3}$, and its negative logarithm was 2.65. The PAA in the product stream had: $M_n$=1093 kDa; $M_w$=1391 kDa; and PDI=1.3.

The compositions of the feed streams, experimental conditions, and results from inventive EXAMPLES 1 to 20 are summarized in TABLE 1 below.

TABLE 1

| EXAMPLE # | SAP, [wt %] | RO Water, [wt %] | 3 wt % H₂O₂ Solution, [wt %] | # of Passes Through LW, [—] | Hydrodynamic Cavitation in LW? | Specific Energy, [MJ/kg] | -LOG (Viscosity Ratio), [—] |
|---|---|---|---|---|---|---|---|
| 1 | 2.5 | 97.5 | — | 1 | No | 1.32 | 0.79 |
| 2 | 2.5 | 97.5 | — | 2 | No | 2.56 | 1.24 |
| 3 | 2.5 | 97.5 | — | 3 | No | 3.72 | 1.65 |
| 4 | 2.5 | 97.5 | — | 4 | No | 4.86 | 2.03 |
| 5 | 2.5 | 97.5 | — | 5 | No | 5.99 | 2.32 |
| 6 | 2.5 | 97.5 | — | 1 | Yes | 1.32 | 0.75 |
| 7 | 2.5 | 97.5 | — | 2 | Yes | 2.56 | 1.38 |
| 8 | 2.5 | 97.5 | — | 3 | Yes | 3.72 | 1.78 |
| 9 | 2.5 | 97.5 | — | 4 | Yes | 4.86 | 2.37 |
| 10 | 2.5 | 97.5 | — | 5 | Yes | 5.99 | 2.49 |
| 11 | 2.5 | — | 97.5 | 1 | No | 1.32 | 0.91 |
| 12 | 2.5 | — | 97.5 | 2 | No | 2.56 | 1.34 |
| 13 | 2.5 | — | 97.5 | 3 | No | 3.72 | 1.77 |
| 14 | 2.5 | — | 97.5 | 4 | No | 4.86 | 2.21 |
| 15 | 2.5 | — | 97.5 | 5 | No | 5.99 | 2.48 |
| 16 | 2.5 | — | 97.5 | 1 | Yes | 1.32 | 1.08 |
| 17 | 2.5 | — | 97.5 | 2 | Yes | 2.56 | 1.64 |
| 18 | 2.5 | — | 97.5 | 3 | Yes | 3.72 | 1.97 |
| 19 | 2.5 | — | 97.5 | 4 | Yes | 4.86 | 2.33 |
| 20 | 2.5 | — | 97.5 | 5 | Yes | 5.99 | 2.65 |

Inventive EXAMPLE 23 shows that the amount of extractables from SAP, produced by the incorporation of about 4.8% of PAA (part of the product stream; from degraded SAP) into virgin SAP (comparative EXAMPLE 21), was about half of the amount of extractables from SAP, produced by the incorporation of about 5.1% of commercial PAA into virgin SAP (comparative EXAMPLE 22).

Example 21—Comparative 112.7 g of distilled water were charged to a 500 mL round bottom flange neck flask fitted with a 4-port flange lid and water-cooled condenser. The flask was cooled in an ice water bath. 46 g of Acrylic Acid (Cat #213040; 99.5%, low water, stabilized; Beantown Chemical, Hudson, N.H.) were added and stirred with a football shaped magnetic stirrer. 34.73 g of Sodium Hydroxide (Cat #415413; 50% in water; Sigma-Aldrich, St Louis, Mo.) were added in small aliquots, keeping the temperature of the mixture between 17° C. and 30° C. After this addition the ice bath was removed. 0.335 g polyethylene glycol diacrylate (Cat #455008; $M_n$ of 700 Da; Sigma-Aldrich) were dissolved in 3.16 g distilled water and added to the flask. The flask was purged with nitrogen for 1 h via a stainless-steel needle inserted via septum and bubbling into the stirred contents. 0.0113 g of L-Ascorbic Acid (Cat #A0278; Reagent Grade; Sigma-Aldrich) were dissolved in 0.5 mL of distilled water and added to the flask. 0.0518 g of potassium persulfate (Cat #216224; ACS Reagent >99%; Sigma-Aldrich) and 0.0021 g of hydrogen peroxide (Stabilized, 1%; Kroger; Topical Solution USP) were dissolved in 2.5 mL of distilled water and added to the flask within 1 min of the L-Ascorbic acid. The flask was observed and when the viscosity increased enough to stop the stirrer bar, the stirrer was switched off. Temperature was monitored and after the peak exotherm had been passed the condenser was removed, the flask was closed and placed in an oven at 60° C. for 18 h. The flask was removed, cooled and the gelled contents broken up by hand into pieces approximately 1 cm round and spread in an aluminum dish. The gel was dried in a fan oven at 120° C. for 6 h, removed, cooled and ground with an IKA A11 Basic S1 mill (IKA Works, Inc., Wilmington, N.C.). The ground powder was sieved and the fraction between 152 μm and 508 μm collected and placed in a controlled environment room at 73° F. and 50% relative humidity for 24 h. 1 g of this powder was analyzed for extractable content following EDANA method NWSP 270.0.R2 (15). The amount of extractables for this sample was 5.85%.

Example 22—Comparative 115.54 g of a 2.5 wt % PAA prepolymer solution (SOKA-LAN® PA 1105; ChemPoint Inc., Bellevue, Wash.; made by diluting 10 g of 35 wt % solution to 140 g with distilled water) were charged to a 500 mL round bottom flange neck flask fitted with a 4-port flange lid and water-cooled condenser. The flask was cooled in an ice water bath. 43.18 g of Acrylic Acid (Cat #213040; 99.5%, low water, stabilized; Beantown Chemical) were added and stirred with a football shaped magnetic stirrer. 34.73 g of Sodium Hydroxide (Cat #415413; 50% in water, Sigma-Aldrich) were added in small aliquots, keeping the temperature of the mixture between 17° C. and 30° C. After this addition the ice bath was removed. 0.335 g of polyethylene glycol diacrylate (Cat #455008; $M_n$ of 700 Da; Sigma-Aldrich) were dissolved in 3.16 g distilled water and added to the flask. The flask was purged with nitrogen for 1 h via a stainless-steel needle inserted via septum and bubbling into the stirred contents. 0.0113 g of L-Ascorbic Acid (Cat #A0278; Reagent Grade; Sigma-Aldrich) were dissolved in 0.5 mL distilled water and added to the flask. 0.0518 g of potassium persulfate (Cat #216224; ACS Reagent >99%; Sigma-Aldrich) and 0.0021 g of hydrogen peroxide (Stabilized, 1%, Kroger, Topical Solution USP) were dissolved in 2.5 mL distilled water and added to the flask within 1 min of the L-Ascorbic acid. The flask was observed and when the viscosity increased enough to stop the stirrer bar, the stirrer was switched off. Temperature was monitored and after the peak exotherm had been passed the condenser was removed, the flask was closed and placed in an oven at 60° C. for 18 h. The flask was removed, cooled and the gelled contents broken up by hand into pieces approximately 1 cm round and spread in an aluminum dish. The gel was dried in a fan oven at 120° C. for 6 h, removed, cooled and ground with an IKA A11 Basic S1 mill (IKA Woks, Inc.). The ground powder was sieved and the fraction between 152 μm and 508 μm collected and placed in a controlled environment room at 73° F. and 50% relative humidity for 24 h. 1 g of this powder was analyzed for extractable content following EDANA method NWSP 270.0.R2 (15). The amount of extractables for this sample was 14.02%.

Example 23

10.54 g of distilled water and 105 g of the product stream of EXAMPLE 10 (i.e., 2.5 wt % PAA solution (with $M_w$ of 1703 kDa) that was produced when the feed stream flowed in the LW and the blade was set 0.5 mm away from the LW orifice) were charged to a 500 mL round bottom flange neck flask fitted with a 4-port flange lid and water-cooled condenser. The flask was cooled in an ice water bath. 43.18 g of Acrylic Acid (Cat #213040; 99.5%, low water, stabilized; Beantown Chemical) was added and stirred with a football shaped magnetic stirrer. 33.08 g of Sodium Hydroxide (Cat #415413; 50% in water; Sigma-Aldrich) mixed with 1.64 g of distilled water was added in small aliquots, keeping the temperature of the mixture between 17° C. and 30° C. After this addition the ice bath was removed. 0.335 g of polyethylene glycol diacrylate (Cat #455008; $M_n$ of 700 Da; Sigma-Aldrich) were dissolved in 3.16 g distilled water and added to the flask. The flask was purged with nitrogen for 1 h via a stainless-steel needle inserted via septum and bubbling into the stirred contents. 0.0113 g of L-Ascorbic Acid (Cat #A0278; Reagent Grade; Sigma-Aldrich) was dissolved in 0.5 mL distilled water and added to the flask. 0.0518 g of potassium persulfate (Cat #216224; ACS Reagent >99%; Sigma-Aldrich) and 0.0021 g of hydrogen peroxide (Stabilized, 1%, Kroger, Topical Solution USP) were dissolved in 2.5 mL distilled water and added to the flask within 1 min of the L-Ascorbic acid. The flask was observed and when the viscosity increased enough to stop the stirrer bar, the stirrer was switched off. Temperature was monitored and after the peak exotherm had been passed the condenser was removed, the flask was closed and placed in an oven at 60° C. for 18 h. The flask was removed, cooled and the gelled contents broken up by hand into pieces approximately 1 cm round and spread in an aluminum dish. The gel was dried in a fan oven at 120° C. for 6 h, removed, cooled and ground with an IKA A11 Basic S1 mill (IKA Works, Inc.). The ground powder was sieved and the fraction between 150 μm and 500 μm collected and placed in a controlled environment room at 73° F. and 50% relative humidity for 24 h. 1 g of this powder was analyzed for extractable content following EDANA method NWSP 270.0.R2 (15). The amount of extractables for this sample was 7.56%.

The compositions of the SAP and results from EXAMPLES 21 to 23 are summarized in TABLE 2 below.

TABLE 2

| EXAMPLE # | Source of PAA, [—] | PAA, [wt %] | PAA $M_w$, [kDa] | PAA PDI, [—] | Amount of Extractables, [wt %] |
|---|---|---|---|---|---|
| 21 | — | — | — | — | 5.85 |
| 22 | SOKALAN ® PA 110S | 5.1 | 250 | 2.9 | 14.02 |
| 23 | EXAMPLE 10 | 4.8 | 1703 | 1.2 | 7.56 |

Inventive EXAMPLE 26 show that the swelling ratio of SAP, produced by the incorporation of about 5% of PAA (part of the product stream; from degraded SAP) into virgin SAP was about the same as the swelling ratio of virgin SAP (comparative EXAMPLE 24).

Example 24—Comparative 0.5 g to 1 g of dry and unground gel, prepared as in EXAMPLE 11, were selected, weighted accurately, and placed in a glass jar with approximately 200 mL of 0.9 wt % NaCl aqueous solution. The jar was allowed to stand without agitation for 3 days. Then, the free liquid was decanted and the swollen gel in the jar was re-weighted. The swelling ratio, in g/g, was calculated as the (weight of swollen gel−weight of dry gel)/weight of dry gel, and measured as 42.0 g/g.

Example 25—Comparative 0.5 g to 1 g of dry and unground gel, prepared as in EXAMPLE 12, were selected, weighted accurately, and placed in a glass jar with approximately 200 mL of 0.9 wt % NaCl aqueous solution. The jar was allowed to stand without agitation for 3 days. Then, the free liquid was decanted and the swollen gel in the jar was re-weighted. The swelling ratio, in g/g, was calculated as the (weight of swollen gel−weight of dry gel)/weight of dry gel, and measured as 55.3 g/g.

Example 26

0.5 g to 1 g of dry and unground gel, prepared as in EXAMPLE 13, were selected, weighted accurately, and placed in a glass jar with approximately 200 mL of 0.9 wt % NaCl aqueous solution. The jar was allowed to stand without agitation for 3 days. Then, the free liquid was decanted and the swollen gel in the jar was re-weighted. The swelling ratio, in g/g, was calculated as the (weight of swollen gel−weight of dry gel)/weight of dry gel, and measured as 47.5 g/g.

Example 27

Several samples of SAP were subjected to the method of the present invention. The SAP used in all examples was polyacrylic acid-based SAP having a capacity (CRC) of 27.6 g/g, a moisture content of 0.4%, and D50 average particle size was 398 μm as measured according to ISO method 13322-2 (the Particle Size Distribution PSD was 63-710 μm). The Absorption Against Pressure (AAP) of the SAP was 25.5 g/g, as determined by the EDANA method WSP 442.2-02. In deviation from EDANA WSP 442.2-02, a pressure of 0.7 psi is applied (whereas the EDANA method specifies a pressure of only 0.3 psi).

The deionized water used below is MilliporeQ. Electrical conductivity was measured with lab conductometer COND 70 INSTRUMENT without CELL, #50010522, equipped with Cell VPT51-01 C=0.1 from XS Instruments or via LF 320/Set, #300243 equipped with TetraCon® 325 from WTW, conductivity is <160 μS/cm at 0° C. Similar equipment for measuring electrical conductivity can be used accordingly. The deionized water used in the examples represents the aqueous carrier. The actual amount of deionized water (=aqueous carrier) in the sample is indicated in TABLE 3 in column "m_w_total".

Unless stated otherwise, the experimental procedure was performed in a climate conditioned room at standard conditions of 23° C.±2° C. temperature and 45%±10% relative humidity.

Procedure:
1. A stock 0.5 wt % solution of potassium persulfate (KPS) was prepared by completely dissolving by stirring 5.0 g of dry salt (Sigma-Aldrich, >=99.0% purity, inventory number 216224-500G) into 995.0 g deionized water (i.e. the aqueous carrier in a 1 L plastic bottle (made of HDPE, Nalgene™). Complete dissolution of the KPS salt is observed when no visible salt crystals remain in the solution.
2. A stock 1.0 wt % solution (30.0 g) of hydrogen peroxide (HPO) was prepared and used fresh (within 24 hours) by adding 1.0 g of 30 wt % HPO (a.k.a. Perhydrol, Sigma-Aldrich, inventory number 216763-500ML) to 29.0 g of deionized water, in a 40 ml glass vial with a plastic snap-on cap.
3. For all examples, an amount of dry SAP of weight "M0" of 2.00 g±0.02 g was measured on a balance into a glass vial of 40 ml volume.
4. Separately, the respective amount of aqueous carrier, with salt diluted therein, as described under point 2. above with mass "Ms0" for each example was prepared in a 100 ml glass beaker (Pyrex), comprising the respective volumes in ml (the density of all solutions was 1.0 g/ml) of 0.5 weight % resp. oxidative salt stock solution ("m_salt_sol") and of additional deionized water ("m_water") (i.e. further amount of aqueous carrier) and, for those examples comprising HPO as indicated in TABLE 3, 1.0 weight % hydrogen peroxide solution ("m_HPO"), measured in by Eppendorf pipettes equipped with 10 ml plastic pipette tips, so that the effective final weight concentrations, "w_salt" for the salt and "w_HPO" for HPO are obtained as given in TABLE 3.
5. The amount "Ms0" of aqueous carrier, with salt dissolved therein, as prepared under point 4, was added to the dry SAP in the glass vial so that all SAP particles are in contact with the aqueous carrier, with salt dissolved therein. The amount "Ms0" for each example is given in TABLE 3. Where needed slight shaking by hand was applied to improve the wetting and uniform swelling of all SAP particles in each sample. Typically, it took between 10 and 60 seconds until the complete amount of aqueous carrier, with salt dissolved therein, was absorbed into the SAP. The amount of aqueous carrier with dissolved salt in the SAP was therefore Ms0/M0.
6. The samples in the glass vial were then closed with a snap-on plastic cap and left to stay for 10 min.
7. A circulation oven (Binder GmbH, Germany, Modell FED 720) was pre-heated to the temperature (i.e. the "elevated temperature") shown in column "Temperature T" in TABLE 3. When the temperature was reached, the respective vials with the samples therein were placed in it on an aluminum tray and a chronometer is started.
8. After the time shown in column "Time" in TABLE 3 is passed, the respective samples in the glass vials were taken out and left to cool down for 10 min.
9. Afterwards, the samples were transferred from the glass vial into a centrifuge vial (Plastic 100 ml centrifugation vials with screw caps). The centrifuge vials were put in a lab centrifuge (Multifuge X1m Thermo Scientific™, equipped with a BIOshield™ 720 rotor) and centrifuged for 30 min at 5000 rpm (equivalent for this setup to 4528 g-force). The centrifugation precipitated any remaining non-degraded and non-soluble parts of the SAP from a clear solution that was formed during degradation. When no liquid was observed to have formed, no centrifugation was performed, e.g. in comparative examples C1 through C4.
10. For all centrifuged samples, the clear solution was decanted and into a separate glass vial (40 ml) and thus separated from any remaining non-degraded and non-soluble parts of the SAP.
11. The netto weight of the clear solution "Ms" was measured. An aliquot part of the clear solution with mass "m_a" is measured via 5 ml plastic syringe into a pre-weighed 10 ml glass vial of empty (without snap-on cap) weight of "m_sc". The 10 ml vial with the clear solution is then put into a vacuum oven (Heraeus Vacutherm type, Thermo Scientific™) at 40° C. and pressure between 10 and 50 mbar for 3 h to ensure substantial evaporation of the water. The dry polymeric residue is weighed and its mass "Mp" is used to calculate the yield "% Y" of the degradation via the formula:

$$Y = 100 * (Mp \times Ms)/(m\_a \times M0) \text{ in wt \%}$$

The yield Y represents therefore the ratio of the extracted soluble polymer as product of SAP degradation solution, to the amount of the initial dry SAP. Given that the SAP was a cross-linked network of polyacrylic acid, the extracted soluble polymer was substantially soluble polyacrylic acid.

12. The test conditions of sample A8 were identical to sample A18** to determine reproducibility of the test procedure.

The details and results are given in TABLE 3.

TABLE 3

Oxidative Degradation Example

| Example | M0 [g] | m_salt_sol [g] *) | m_HPO [g] | m_water [g] | w_salt [wt %] | w_HPO [wt %] | m_total [g] | Ms0, [g] | Temperature T [° C.] | Time [hours] | Ms [g] | m_a [g] | Mp [g] | Y [weight -%] |
|---|---|---|---|---|---|---|---|---|---|---|---|---|---|---|
| A1 | 2.02 | 6 | 0 | 24 | 0.1 | 0 | 29.97 | 30 | 80 | 3 | 17.06 | 2.0169 | 0.1208 | 50.6 |
| A2 | 2.00 | 6 | 0 | 24 | 0.1 | 0 | 29.97 | 30 | 80 | 4 | 12.72 | 2.0269 | 0.1123 | 35.2 |
| A3 | 2.00 | 3 | 0 | 27 | 0.05 | 0 | 29.985 | 30 | 80 | 4 | 8.42 | 2.0099 | 0.1308 | 27.4 |
| A5 | 2.00 | 6 | 3 | 21 | 0.1 | 0.1 | 29.94 | 30 | 80 | 3 | 18.67 | 2.0179 | 0.1296 | 60.0 |
| A6 | 2.02 | 4 | 0 | 16 | 0.1 | 0 | 19.98 | 20 | 80 | 3 | 3.1 | 2.014 | 0.153 | 11.7 |
| A7 | 2.00 | 6 | 0 | 24 | 0.1 | 0 | 29.97 | 30 | 100 | 3 | 19.05 | 2.0166 | 0.178 | 84.1 |
| A8 | 1.99 | 4 | 0 | 16 | 0.1 | 0 | 19.98 | 20 | 100 | 3 | 10.1 | 2.0087 | 0.2188 | 55.3 |
| A9 | 2.01 | 4 | 1 | 15 | 0.1 | 0.05 | 19.97 | 20 | 80 | 3 | 7.71 | 2.0009 | 0.1949 | 37.4 |
| A10 | 2.02 | 4 | 0.5 | 15.5 | 0.1 | 0.025 | 19.975 | 20 | 80 | 3 | 7.42 | 2.028 | 0.2041 | 37.0 |
| A11 | 1.99 | 4 | 1 | 15 | 0.1 | 0.05 | 19.97 | 20 | 100 | 3 | 14.31 | 2.0008 | 0.2274 | 81.7 |
| A12 | 2.00 | 4 | 1 | 15 | 0.1 | 0.05 | 19.97 | 20 | 110 | 1 | 9.92 | 2.01435 | 0.249 | 61.3 |

TABLE 3-continued

Oxidative Degradation Example

| Example | M0 [g] | m_salt_sol [g] *) | m_HPO [g] | m_water [g] | w_salt [wt %] | w_HPO [wt %] | m_w_total [g] | Ms0, [g] | Temperature T [° C.] | Time [hours] | Ms [g] | m_a [g] | Mp [g] | Y [weight - %] |
|---|---|---|---|---|---|---|---|---|---|---|---|---|---|---|
| A15 | 2.00 | 4 | 0 | 16 | 0.1 | 0 | 19.98 | 20 | 100 | 3 | 9.93 | 2.0157 | 0.2046 | 50.4 |
| A17 | 2.00 | 20 | 0 | 0 | 0.5 | 0 | 19.9 | 20 | 100 | 3 | 14.26 | 2.0117 | 0.2143 | 76.0 |
| A18**) | 2.00 | 4 | 0 | 16 | 0.1 | 0 | 19.98 | 20 | 100 | 3 | 9.6 | 2.0019 | 0.2193 | 52.6 |
| C1 | 2.00 | 0 | 1.5 | 28.5 | 0 | 0.05 | 29.985 | 30 | 80 | 4 | no liquid | — | — | 0.0 |
| C2 | 1.99 | 0 | 0 | 30 | 0 | 0 | 30 | 30 | 80 | 4 | no liquid | — | — | 0.0 |
| C3 | 2.01 | 0 | 1 | 19 | 0 | 0.05 | 19.99 | 20 | 100 | 3 | no liquid | — | — | 0.0 |
| C4 | 2.00 | 0 | 0 | 20 | 0 | 0 | 20 | 20 | 100 | 3 | no liquid | — | — | 0.0 |

*) All examples with potassium persulfate $K_2S_2O_8$, except A15, which was with sodium persulfate $Na_2S_2O_8$.
**)A18 is repeated A8 option/conditions to confirm repeatability.
Comparative examples C1 to C4 were done without any salt.

VII Methods

SAP "GIC 31187" Preparation

Deionized water with resistance >5 MΩ·cm at 25° C., and ice made from the deionized water are used. A sample of about 100 g of the ice is melted in a 250 mL glass beaker (VWR International Ltd, Leicestershire, UK; part #LENZ07001049) and the conductivity is measured (e.g. via COND 70 INSTRUMENT without CELL, #50010522, equipped with Cell VPT51-01 C=0.1 from XS Instruments (Carpi Mo., Italy) or via LF 320/Set, #300243 equipped with TetraCon 325 from WTW (Xylem Inc., Rye Brook, N.Y., USA)) as <1.6 µS/cm at 0° C.

A 20 L resin kettle (equipped with a four-necked glass cover closed with septa, suited for the introduction of a thermometer and syringe needles) is charged with about 8713.2 g of ice prepared as described above. A magnetic stirrer, capable of mixing the whole content (when liquid), is added and stirring is started (e.g. elliptic magnetic stir bar from VWR, part #442-0507). Stirring can take place at 250-600 rpm. 315.6 g of deionized water is taken to dissolve 33.52 g of "PEG700-DA" (e.g. poly(ethylene glycol)-diacrylate with number average molecular weight of about 700 g/mol, from Sigma-Aldrich, CAS #26570-48-9) in a 500 mL glass beaker. The glass beaker with the "PEG700-DA" solution is covered with parafilm and set aside. 250.0 g of deionized water is used to dissolve 5.175 g of "KPS" (potassium persulfate from Sigma-Aldrich, CAS #7727-21-1) in a 500 mL glass beaker. To this solution, about 0.208 g of 1 wt % aqueous solution of hydrogen peroxide (prepared by dilution with deionized water of 30 wt % aqueous hydrogen peroxide solution obtained from Sigma-Aldrich, CAS #7722-84-1) are added. The so-obtained "KPS" solution is closed and set aside. This solution must be used within 6 h of preparation. 50.0 g of deionized water are used to dissolve 1.128 g of ascorbic acid (from Sigma-Aldrich, CAS #50-81-7) in a 100 mL glass vial with a plastic cap. The solution "ascorbic acid" is closed and set aside. 4599.600 g of glacial acrylic acid (GAA, CAS #79-10-7; Acrylic Acid for synthesis, from Merck, #800181) are added to the ice in the resin kettle while stirring is continued. A thermometer is introduced into the resin kettle and in total 3472.600 g of 50 wt % NaOH solution (for analysis, from Merck, #158793, CAS #1310-73-2) and about 250.0 g of ice (prepared from de-ionized water) are added subsequently in portions such that the temperature is in the range of about 15-30° C. The mixture is continuously stirred. The "PEG700-DA" solution is added to the mixture of acrylic acid (AA), NaOH solution, and ice at a temperature of about 15-30° C., while stirring is continued. The vessel that contained the "PEG700-DA" solution is washed twice with deionized water in an amount of about 3% of the "PEG700-DA" solution volume per wash. The wash water of both washing steps is added to the stirred mixture. Deionized water (the remaining amount required to achieve the total amount of (ice+water) of 11887.47 g) is added to the stirred mixture, e.g. ca. 2308.67 g of deionized water. Then, the resin kettle is closed, and a pressure relief is provided e.g. by puncturing two syringe needles through the septa. The solution is then purged vigorously with argon via an injection needle (stainless steel 304 syringe, 36 in. long, size 16 gauge from Sigma-Aldrich, part #Z152404-1EA) at about 0.4 bar while stirring at about 250-600 rpm. The argon stream is placed close to the stirrer for efficient and fast removal of dissolved oxygen. After about minimum 1 h and maximum 2 h of argon purging and stirring, the "ascorbic acid" solution is added to the reaction mixture at a temperature of about 20-25° C. via a syringe while stirring and argon purging is continued. Within 1 min, the "KPS" solution is also added via funnel through one of the 4 necks in the glass cover, which is quickly covered after the addition of "KPS" is completed. After the initiator solutions ("ascorbic acid" and "KPS" solutions) are mixed with the reaction mixture, stirring and argon purging is continued but the purging needle is moved above the reaction mixture and temperature is recorded. As the polymerization starts, indicated by temperature rise in small steps, and more specifically after the gel point, characterized by sudden increase in viscosity, stirring is stopped. The temperature is monitored; typically, it rises from about 23° C. to about 70-95° C. within 60 min. Once the temperature reaches a maximum (the reaction mixture can reach for example up to about 105° C.) and starts dropping, the resin kettle is transferred into a circulation oven (Binder FED 720) and kept at about 60° C. for about 20 h.

After the polymerization completion time in the circulation oven, the latter is switched off and the resin kettle is allowed to cool down to about 20° C. to 40° C. while remaining in the oven. After that, the gel is removed and broken manually or cut with scissors into smaller pieces. The gel is ground with a grinder (X70G from Scharfen with Unger R70 plate system: 3 pre-cutter kidney plates with straight holes at 17 mm diameter), put onto perforated stainless steel dishes (hole diameter 4.8 mm, 50 cm×50 cm, 0.55 mm caliper, 50% open area, from RS; max. height of gel before drying: about 3 cm) and transferred into a circulation oven (e.g. Binder FED 720) equipped with a condensate trap from DAMM (condensation via cooling below dew point via heat exchanger) to dry the circulation air, cooled to 5° C. via a thermostat (Julabo FP 50)) at about 120° C. for about 20 h. The dried gel is then ground using a centrifuge mill (e.g. Retsch ZM 200 with vibratory feeder DR 100 (setting 50-60), interchangeable sieve with 1.5 mm opening settings, rotary speed 8000 rpm). The milled polymer is then sieved via a sieving machine (e.g. AS 400 control from Retsch with sieves DIN/ISO 3310-1 of 150 µm and 710 µm at about 250 rpm for about for 10 min) to a sieve cut which contains >90 wt % of the materials between 150 and 850 µm to obtain the Base Polymer "SK-002-A". The particles passing through the 150 µm sieve were collected under the name "RD 5717". The hereto described procedure is repeated two more times for stockpiling of SAP particles with cut 150-710 µm under the names "SK-002-E" and "SK-002-K", respectively. The corresponding cuts below 150 µm were collected as described for "SK-002-A" and under the names "GIC 31749" and "GIC 30266", respectively. To make the "GIC 31187" material, the materials "RD 5717", "GIC 31749", and "GIC 30266", all with particle size under 150 µm, were combined together and sieved again, as described above, but with sieves DIN/ISO 3310-1 with mesh sizes 63 µm and 150 µm, respectively.

SAP "GIC 31187" Properties

The so obtained SAP material was analyzed for capacity, moisture, and extractable polymer using the Centrifuge Retention Capacity (CRC) test method (EDANA method WSP 241.2.R3), moisture test method (EDANA method WSP 230.2.R3), and extractable polymer (amount of extractables) test method (EDANA method WSP 270.2.R3), respectively. The results were as follows: CRC=50.3 g/g; Moisture=0.3 wt %; and Extractable Polymer=15.03 wt %.

Total Energy Calculations

The total energy is the electric energy that is supplied to the extensional flow device and is based on the voltage and amperage of the device, and the residence time of the feed stream. The extensional flow device typically calculates the total energy from the motor torque and speed, and residence time of the feed stream in the extensional flow device. The total energy per unit mass of SAP is then calculated from the total energy and the amount of SAP that is in the feed stream.

Specific Energy Calculations

The specific energy is the energy dissipated in the feed stream, it is used to convert SAP to PAA, and is based on the pressure drop in the feed stream as it flows through the extensional flow system. As an example, if the pressure drop in the feed stream is 4945 psi (341 bar), the volume of the feed stream is 400 mL, and the feed stream density is 1 g/mL, then the specific energy is calculated as: (341 (bar)× 0.4 (L))/(400 (mL)×0.025 (g SAP/g)×1 (g/mL))=1.36 MJ/kg SAP.

Molecular Weight Distribution (MWD) Analysis

It is done using Gel Permeation Chromatography (GPC) with Multi-Angle Light Scattering (MALS) and Refractive Index (RI) detection. Samples are made at concentration of 1 mg/mL in 0.1M $NaNO_3$/0.02 wt % Sodium Azide ($NaN_3$) with a gentle mixing at room temperature for overnight hydration. Samples are then filtered through a 0.8 µm filter before the GPC-MALS/RI analysis. The absolute MWD distribution is calculated using do/dc value of 0.15.

The foregoing description is given for clearness of understanding only, and no unnecessary limitations should be understood therefrom, as modifications within the scope of the invention may be apparent to those having ordinary skill in the art.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, comprising any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for degrading a superabsorbent polymer (SAP) to poly(acrylic acid) (PAA) comprising flowing a feed stream comprising said SAP into an inlet of an extensional flow device and producing a product stream comprising said PAA at an outlet of said extensional flow device; wherein said feed stream comprises said SAP at a concentration greater than about 1 wt %; wherein said feed stream has a residence time in said extensional flow device of less than about 120 s; and wherein said degradation of said SAP to said PAA requires a total energy of less than about 50 MJ/kg SAP.

2. The method of claim 1, wherein said residence time is less than about 60 s.

3. The method of claim 1, wherein said total energy is less than about 16 MJ/kg SAP.

4. The method of claim 1, wherein said feed stream comprises SAP and water.

5. The method of claim 1, wherein said feed stream comprises SAP and hydrogen peroxide.

6. The method of claim 1, wherein the feed stream comprises SAP and an enzyme; and wherein said enzyme has activity against said SAP.

7. The method of claim 6, wherein the enzymes are at least one hydrolases or oxidases.

8. The method of claim 7, wherein the hydrolases are ester hydrolases, carboxyl ester hydrolases, ether hydrolases, cutinases, lipases, esterases, or carboyl-esterases.

9. The method of claim 7, wherein the hydrolase is an ether hydrolase.

10. The method of claim 1, wherein said SAP has degree of neutralization (DN) greater than about 50%.

11. The method of claim 1, wherein said SAP has DN between about 65% and about 75%.

12. The method of claim 1, wherein said feed stream has a viscosity; wherein said product stream has a viscosity; wherein the ratio of the viscosity of the product stream to the viscosity of the feed stream is the viscosity ratio; and wherein the negative logarithm of said viscosity ratio is less than about 6.

13. The method of claim 1, wherein said feed stream has a viscosity; wherein said product stream has a viscosity; wherein the ratio of the viscosity of the product stream to the viscosity of the feed stream is the viscosity ratio; and wherein the negative logarithm of said viscosity ratio is less than about 4.

14. The method of claim 1, wherein said feed stream has a viscosity; wherein said product stream has a viscosity; wherein the ratio of the viscosity of the product stream to the viscosity of the feed stream is the viscosity ratio; and wherein the negative logarithm of said viscosity ratio is less than about 2.

15. The method of claim 1, wherein said PAA has a weight-average molecular weight less than about 2,000,000 g/mol.

16. The method of claim 1, wherein said PAA has a weight-average molecular weight less than about 1,000,000 g/mol.

17. The method of claim 1, wherein said PAA has a polydispersity index (PDI) less than about 4.

18. The method of claim 1, wherein said PAA is used to produce a recycled SAP; said SAP comprises PAA at a concentration; and wherein said PAA concentration is less than about 30%.

19. The method of claim 1, wherein said PAA is used to produce a recycled SAP; wherein said recycled SAP has an amount of extractables; and wherein said amount of extractables is less than about 15%.

20. The method of claim 1, wherein said PAA is used to produce a recycled SAP; wherein said recycled SAP has a swelling ratio; and wherein said swelling ratio is greater than about 45 g/g.

21. A method for degrading a superabsorbent polymer (SAP) to poly(acrylic acid) (PAA) comprising flowing a feed stream comprising said SAP into an inlet of an extensional flow device and producing a product stream comprising PAA at an outlet of said extensional flow device; wherein said feed stream comprises water and SAP at a concentration greater than about 1 wt %; wherein said feed stream has a residence time in said extensional flow device of less than about 120 s; wherein said degradation of said SAP to said PAA requires a total energy of less than about 16 MJ/kg SAP; and wherein said PAA has a weight-average molecular weight less than about 1,000,000 g/mol.

22. A method for degrading a superabsorbent polymer (SAP) to poly(acrylic acid) (PAA) comprising flowing a feed stream comprising said SAP into an inlet of an extensional flow device and producing a product stream comprising PAA at an outlet of said extensional flow device; wherein said feed stream comprises water and SAP at a concentration greater than about 5 wt %; wherein said feed stream has a residence time in said extensional flow device of less than about 120 s; wherein said degradation of said SAP to said PAA requires a total energy of less than about 16 MJ/kg SAP; and wherein said PAA has a weight-average molecular weight less than about 1,000,000 g/mol.

23. The method of claim 22, wherein said feed stream has a viscosity; wherein said product stream has a viscosity; wherein the ratio of the viscosity of the product stream to the viscosity of the feed stream is the viscosity ratio; and wherein the negative logarithm of said viscosity ratio is less than about 4.

24. The method of claim 22, wherein said SAP has DN between about 65% and about 75%.

25. The method of claim 22, wherein said feed stream comprises SAP and hydrogen peroxide.

* * * * *